(12) United States Patent
Concannon

(10) Patent No.: US 8,007,331 B2
(45) Date of Patent: Aug. 30, 2011

(54) FLOAT AND A FLOATABLE STRUCTURE

(75) Inventor: John Francis Concannon, Tuam (IE)

(73) Assignees: Rodicon Limited, Tuam (IE); John Francis Concannon, Tuam (IE)

( * ) Notice: Subject to any disclaimer, the term of this patent is extended or adjusted under 35 U.S.C. 154(b) by 387 days.

(21) Appl. No.: 11/913,506

(22) PCT Filed: May 3, 2006

(86) PCT No.: PCT/IE2006/000044
§ 371 (c)(1),
(2), (4) Date: Mar. 6, 2008

(87) PCT Pub. No.: WO2006/117767
PCT Pub. Date: Nov. 9, 2006

(65) Prior Publication Data
US 2008/0194160 A1 Aug. 14, 2008

(30) Foreign Application Priority Data

May 4, 2005 (IE) .................................. S2005/0273
Mar. 20, 2006 (IE) .................................. S2006/0215

(51) Int. Cl.
*B63B 22/00* (2006.01)
(52) U.S. Cl. ............................................. 441/1; 441/22
(58) Field of Classification Search .................. 114/61.2, 114/219, 267; 441/22, 28, 30, 1
See application file for complete search history.

(56) References Cited

U.S. PATENT DOCUMENTS

| | | | | |
|---|---|---|---|---|
| 9,389 A * | 11/1852 | Phillips | .......................... | 114/330 |
| 3,191,202 A | 6/1965 | Handler | | |
| 3,752,102 A * | 8/1973 | Shuman | .......................... | 114/267 |
| 4,004,308 A | 1/1977 | Gongwer | | |
| 4,675,686 A | 6/1987 | Robinson et al. | | |
| 5,439,315 A * | 8/1995 | MacKenzie et al. | ......... | 405/60.5 |
| 5,443,408 A * | 8/1995 | Kimball | .......................... | 441/22 |
| 6,162,106 A * | 12/2000 | Shieh | .............................. | 441/30 |
| 7,289,907 B2 * | 10/2007 | Meinig et al. | ..................... | 702/2 |
| 2006/0037551 A1 | 2/2006 | Quinta Cortinas | | |

FOREIGN PATENT DOCUMENTS

| | | |
|---|---|---|
| EP | 0 137 087 A1 | 4/1985 |
| FR | 2 415 959 A | 8/1979 |
| FR | 2 562 387 A1 | 10/1985 |
| GB | 2 372 964 A | 9/2002 |
| WO | WO 2004/002220 A1 | 1/2004 |

* cited by examiner

*Primary Examiner* — Stephen Avila
(74) *Attorney, Agent, or Firm* — Sughrue Mion, PLLC

(57) ABSTRACT

A float (1) comprising a hollow pneumatically pressurisable ovoid shell (5) is provided with a damping plate (12) extending laterally outwardly around the shell (5) for damping vertical upward and downward movement of the float in water during stormy conditions, thereby minimizing the effect of the buoyant upward propulsion force acting on the float when the float is submerged in stormy conditions. A keel (18) extends downwardly from the float (5) for minimizing rolling movement of the float (1). A pair of coupling plates (22) extending from front and rear ends (19,20) of the shell (5) facilitate coupling of the float (1) between a pair of spaced apart tethering ropes used in mussel growing. A plurality of the floats (1) may be secured between a pair of spaced apart tethering ropes at spaced apart intervals along the tethering ropes for supporting the tethering ropes so that crop ropes impregnated with mussel spawn may be suspended from the tethering ropes for growing mussels. A navigational buoy (60) is also disclosed, which comprises a lower float (61) and a pillar (62) extending upwardly therefrom for carrying navigational and other instrumentation.

19 Claims, 20 Drawing Sheets

FLOAT AND A FLOATABLE STRUCTURE

The present invention relates to a float, such as a float for suspending an article submersed in water, or a float of the type used as a navigational buoy or for carrying instrumentation, such as weather monitoring instrumentation, although the invention is not limited to such floats. The invention is also directed towards a floatable structure of the type suitable for use as a navigational buoy or for carrying instrumentation, and the invention also relates to a method for damping buoyant movement of a float in water, as well as to a method for growing marine molluscs.

Floats for suspending articles submersed in water, for example, in the sea, lakes, rivers and the like are well known. Such floats, are commonly used in the commercial mussel growing industry for suspending ropes impregnated with mussel spawn in the sea, and mussels which grow on the ropes are harvested by withdrawing the ropes from the water. Such ropes are commonly referred to as crop ropes. In general, a plurality of such floats are secured between a pair of spaced apart tethering ropes, at spaced apart intervals along the tethering ropes, and the crop ropes are secured to and suspended from the tethering ropes at spaced apart intervals along the tethering ropes between the floats, so that the crop ropes depend downwardly into the sea. Respective opposite ends of the tethering ropes are secured to suitable moorings. Such arrangements of floats will be well known to those skilled in the art. In general, the floats are of cylindrical construction terminating in opposite domed ends. Coupling members extend axially from the domed ends, and the spaced apart tethering ropes are secured to the coupling members, so that the floats extend between the tethering ropes with their respective central axes extending perpendicularly to the tethering ropes.

Typically, the floats are of plastic material, and may be foam filled, or air filled. Such floats known heretofore suffer from a serious disadvantage. In general, such floats are suitable for use in sheltered waters only; they are unsuitable for use in open unprotected waters. When subjected to waves in open unprotected water, and in particular, when subjected to relatively large waves which occur in stormy conditions, and which can be up to ten metres in height and greater, the floats become submerged, and can be submerged to depths of up to twenty metres and greater. This is particularly so as the mussels grow on the crop ropes and the crop ropes become increasingly heavier. When submerged to such depths there is a danger of the floats collapsing, and where such floats do not collapse, the buoyant upward force on the floats tend to propel the floats out of the water to heights above the water which can be up to four metres. This is totally undesirable, since the rapid propulsion of the floats out of the water and their sudden return tends to shake the mussels from the crop ropes, and the larger the mussels, the greater is the danger of the mussels being shaken from the crop ropes.

There is therefore a need for a float which addresses this problem, and significantly reduces the danger of mussels being shaken from the crop ropes.

Floats are also commonly used for carrying instrumentation, for example, instrumentation for monitoring weather conditions at sea, on lakes and the like, such as wind speed and direction, rainfall amounts, temperature, humidity, air pressure and the like. Floats are also commonly used as navigational buoys for marking shipping lanes and areas which are hazardous for shipping. All such floats are secured by anchor ropes, cables or chains to seabed moorings, and suffer from a similar problem to that discussed above, in that in stormy conditions, when subjected to relatively large waves, the navigational buoys or floats carrying instrumentation can be submerged to depths of up to twenty metres or greater, and the buoyant upward force at such depths can be sufficient to propel the float upwardly with a sufficient force to cause the mooring rope or ropes to snap, resulting in loss of the float. Additionally, where floats are used for carrying instrumentation, for example, weather monitoring and environmental monitoring instrumentation, or indeed a light transmitting beacon, the upward buoyant forces to which such floats are subjected during stormy conditions may be sufficient to damage the instrumentation, beacons or other such items carried on the float.

Accordingly, there is a need for a float and a navigational buoy as well as a floatable structure which address the problems discussed above.

The present invention is directed towards providing such a float and a navigational buoy, and the invention is also directed towards providing a floatable structure comprising the float, which is suitable for use as a navigational buoy or for carrying instrumentation, and the invention is also directed towards a method for damping buoyant movement of a float in water, and to a method for growing marine molluscs.

According to the invention there is provided a float comprising a damping means extending laterally from the float for damping buoyant movement of the float in water in a generally vertical direction.

Preferably, the damping means extends outwardly on opposite sides of the float. Advantageously, the damping means extends completely around the float. Ideally, the float defines a submersible surface, and the damping means extends from the submersible surface.

In one embodiment of the invention the damping means damps upward buoyant movement of the float. Preferably, the damping means also damps downward movement of the float. Advantageously, the damping means damps rolling movement of the float. Preferably, the damping means also damps pitching movement of the float.

In one embodiment of the invention the damping means defines a first plane. Preferably, the first plane extends in use substantially horizontally.

In another embodiment of the invention the float is of buoyancy such that a normal water line of the float defines a third horizontal plane in use. Preferably, the first plane defined by the damping means extends in use at a level spaced apart from and below the third horizontal plane. Alternatively, the first plane defined by the damping means extends in use at a level coinciding with the third horizontal plane.

In another embodiment of the invention a keel extends from the float for minimising rolling movement of the float.

In a further embodiment of the invention a pair of keels are provided extending from the float.

In one embodiment of the invention each keel defines a corresponding keel plane. Preferably, the keel planes of the respective keels extend perpendicularly to each other. Advantageously, each keel plane extends perpendicularly to the first plane defined by the damping means. Ideally, each keel extends along the float and terminates in respective ends in the damping means.

In one embodiment of the invention each keel is formed by a rib extending from the float, and preferably, each keel is of a rigid material. Ideally, each keel is integrally formed with the float.

In another embodiment of the invention the float defines a first major plane coinciding with a horizontal plane, which in use extends through the float at its maximum horizontal cross-sectional area, and a second major plane coinciding with a vertical plane, which in use extends through the float at its maximum vertical cross-sectional area. Preferably, the first plane defined by the damping means extends parallel to the first major plane defined by the float. Advantageously, the first plane defined by the damping means is spaced apart from the first major plane defined by the float, and preferably, the first plane defined by the damping means extends at a level below the first major plane defined by the float. Alternatively, the first plane defined by the damping means coincides with the first major plane defined by the float.

In one embodiment of the invention the second major plane defined by the float extends at a level spaced apart and below the third plane defined by the waterline. Alternatively, the second major plane defined by the float extends at a level coinciding with the third plane defined by the waterline.

In one embodiment of the invention a coupling means is provided for coupling the float to a mooring rope.

In another embodiment of the invention the coupling means is located in the keel. Preferably, the coupling means is located adjacent a lower end of the keel in use.

In a further embodiment of the invention the coupling means is located in the damping means. Preferably, a pair of coupling means are provided, and the coupling means are located in the damping means at spaced apart locations. Advantageously, the respective coupling means are located equi-spaced around the float.

Ideally, the keel extends between the respective coupling means.

In one embodiment of the invention each coupling means comprises a coupling plate and at least one bore extending through the coupling plate.

In one embodiment of the invention the damping means comprises at least one damping plate. Preferably, each damping plate is of a rigid material. Advantageously, the damping means is integrally formed with the float.

In another embodiment of the invention the float comprises a hollow shell defining an airtight hollow interior region.

In a further embodiment of the invention a valving means is provided in the shell for facilitating pressurising the hollow interior region with a gaseous medium. Preferably, the gaseous medium is air.

Advantageously, the hollow shell is of a rigid material.

In another embodiment of the invention the shell of the float is adapted for sustaining pressure within the hollow interior region of at least one and a half atmospheres. Preferably, the shell of the float is adapted for sustaining pressure within the hollow interior region of at least two atmospheres.

In one embodiment of the invention the float is of ovoid shape, and the first major plane defined by the float coincides with a horizontal major plane of the ovoid, and the second major plane defined by the float coincides with a vertical major plane of the ovoid. Preferably, the float is of substantially elliptical cross-section when viewed in plan. Advantageously, the float is of circular transverse cross-section when viewed end on.

In another embodiment of the invention the float is of substantially spherical shape. Preferably, the float is of circular transverse cross-section when viewed in plan. Advantageously, the float is of slightly ovoid vertical cross-section.

In another embodiment of the invention a plurality of spaced apart radially extending reinforcing fillets extend between the float and the damping means for strengthening the joint between the damping means and the float.

In a further embodiment of the invention a plurality of spaced apart ribs extend radially outwardly and around the float parallel to a fourth plane defined by the float which extends transversely of the first and second planes defined by the float.

In one embodiment of the invention the float is adapted for securing to and supporting a tethering rope which is adapted for suspending crop ropes therefrom. Preferably, the float is adapted for supporting a pair of spaced apart tethering ropes, with the float located between the respective tethering ropes.

In another embodiment of the invention a pillar extends upwardly from the float.

In a further embodiment of the invention the float is adapted for use as a navigational buoy.

In another embodiment of the invention the pillar terminates in a receiving means for receiving any one or more of a beacon, a radar reflector and instrumentation. Preferably, any one or more of the beacon, radar reflector and instrumentation is mounted on the receiving means, and preferably, the instrumentation is selected from any one or more of the following:
   a temperature sensor,
   a wind speed sensor,
   a wind direction sensor,
   a humidity sensor,
   an ambient air pressure sensor.

Advantageously, the pillar is integrally formed with the float.

In one embodiment of the invention the float is of plastics material and preferably, the float is formed by rotational moulding.

The invention also provides a floatable structure comprising the float according to the invention, and a pillar extending upwardly therefrom.

In one embodiment of the invention the pillar is adapted so that the floatable structure is suitable for use as a navigational buoy.

In another embodiment of the invention the pillar terminates in a receiving means for receiving any one or more of the following:
   a beacon,
   a radar reflector,
   instrumentation.

In a further embodiment of the invention any one or more of the following are mounted on the receiving means:
   a beacon,
   a radar reflector,
   instrumentation.

Preferably, the instrumentation comprises any one or more of the following:
   a temperature sensor,
   a wind speed sensor,
   a wind direction sensor,
   a humidity sensor,
   an ambient air pressure sensor.

In one embodiment of the invention ballast is provided for ballasting the floatable structure. Preferably, the ballast is located within the float.

The invention also provides a method for damping buoyant movement of a float in water in a generally vertical direction, the method comprising providing a damping means extending laterally from the float.

Preferably, the damping means extends from a surface of the float, which in use is submersed.

Advantageously, a keel is provided extending from the float for minimising rolling of the float.

Preferably, the float is provided in the form of a hollow shell defining an airtight hollow interior region, and the method further comprises pressurising the hollow interior region thereof with a gaseous medium, and advantageously, the hollow interior region is pressurised to a pressure of at least one and a half atmospheres, and ideally, the hollow interior region is pressurised to a pressure of at least two atmospheres.

In another embodiment of the invention the method further comprises providing a coupling means on the float for coupling the float to one of a tethering rope and a mooring rope.

The invention also provides a method for growing marine molluscs, the method comprising supporting an elongated tethering rope on a plurality of spaced apart floats according to the invention, and suspending crop ropes impregnated with a spawn of the marine molluscs from the tethering rope and/or the floats.

Preferably, a pair of spaced apart tethering ropes are supported by a plurality of the spaced apart floats coupled to and extending between the tethering ropes, and crop ropes being suspended from the respective tethering ropes and/or the floats.

The advantages of the invention are many. In particular, buoyant movement of the float and the submersible structure according to the invention in a generally vertical direction is damped, and in particular, upward buoyant movement of the float and floatable structure after submersion thereof is damped. The damping means of the float and the floatable structure damps the effect of the upward buoyant force exerted on the float or floatable structure when submerged, and in particular when submerged to significant depths, resulting from wave motion in stormy seas. Accordingly, the damping means minimises the effect of the upward propulsion forces to which the float or floatable structure is subjected when submerged, and in particular, when submersed by waves in stormy conditions. By minimising the effect of the upward propulsion forces on the float and floatable structure, the height to which the float or floatable structure is projected out of and above the water by the propulsion forces is minimised, and in many cases the upward movement is sufficiently damped to avoid the float or floatable structure being propelled out of the water. Thus, where the float or floatable structure is moored by a mooring rope to a sea bed, lake bed, river bed or the like, any danger of a mooring rope being snapped as a result of the upward propulsion force to which the float or floatable structure is subjected is minimised and in general avoided.

Additionally, where the float according to the invention is used for supporting tethering ropes from which crop ropes are suspended for growing marine molluscs and the like, by damping the upward movement of the float resulting from the buoyant upward propulsion forces to which the float is subjected when submerged in the water in stormy conditions, upward movement of the crop ropes is damped to the extent that the crop ropes, in general, are not propelled from the water by the upward buoyant propulsion forces on the floats. This, thus, minimises the danger of marine molluscs being lost from the crop ropes by, for example, being shaken therefrom. Additionally, damping the upward vertical movement, and indeed, the downward vertical movement of the floats also minimises any danger of the crop ropes rubbing against each other, thereby minimising any danger of marine molluscs being detached therefrom. These advantages are derived by virtue of the fact that the float and floatable structure according to the invention are provided with the damping means.

The provision of a keel further enhances the effect of the damping means, since the provision of a keel minimises rolling of the float or floatable structure, thereby maximising the vertical upward and downward damping effect of the damping means on vertical movement of the float or floatable structure.

Additionally, since the damping means also damps downward vertical movement of the float or floatable structure according to the invention in stormy conditions where the float or floatable structure is likely to be submerged, the depth to which the float or floatable structure is submerged is minimised, and thus, by minimising the depth to which the float or floatable structure is submerged, the upward buoyant propulsion forces to which the float or floatable structure are subjected are likewise minimised. Indeed, by damping the downward movement of the float according to the invention, in may cases a wave will have passed before the float is submerged to any significant depth, thereby further minimising the upward buoyant force to which the float is subjected, and thus minimising any danger of the float being propelled out of the water.

Pressurising the hollow interior region of the float or floatable structure has the added advantage that the danger of the float or floatable structure collapsing while submerged is minimised, and in general is eliminated, and thus, even where the float or floatable structure is submerged in excessively stormy conditions to relatively great depths, in general, the float or floatable structures according to the invention survives such submersion.

Where the float or floatable structure according to the invention is used for carrying instrumentation, and in particular, sensitive instrumentation, by damping the upward vertical movement of the float and floatable structure, the effect of the buoyant upward propulsion forces on the float and floatable structure is minimised, thus minimising shocks to which the instrumentation carried on the float or floatable structure are subjected.

The invention will be more clearly understood from the following description of some preferred embodiments thereof which are given by way of example only with reference to the accompanying drawings in which.

Figure 10:
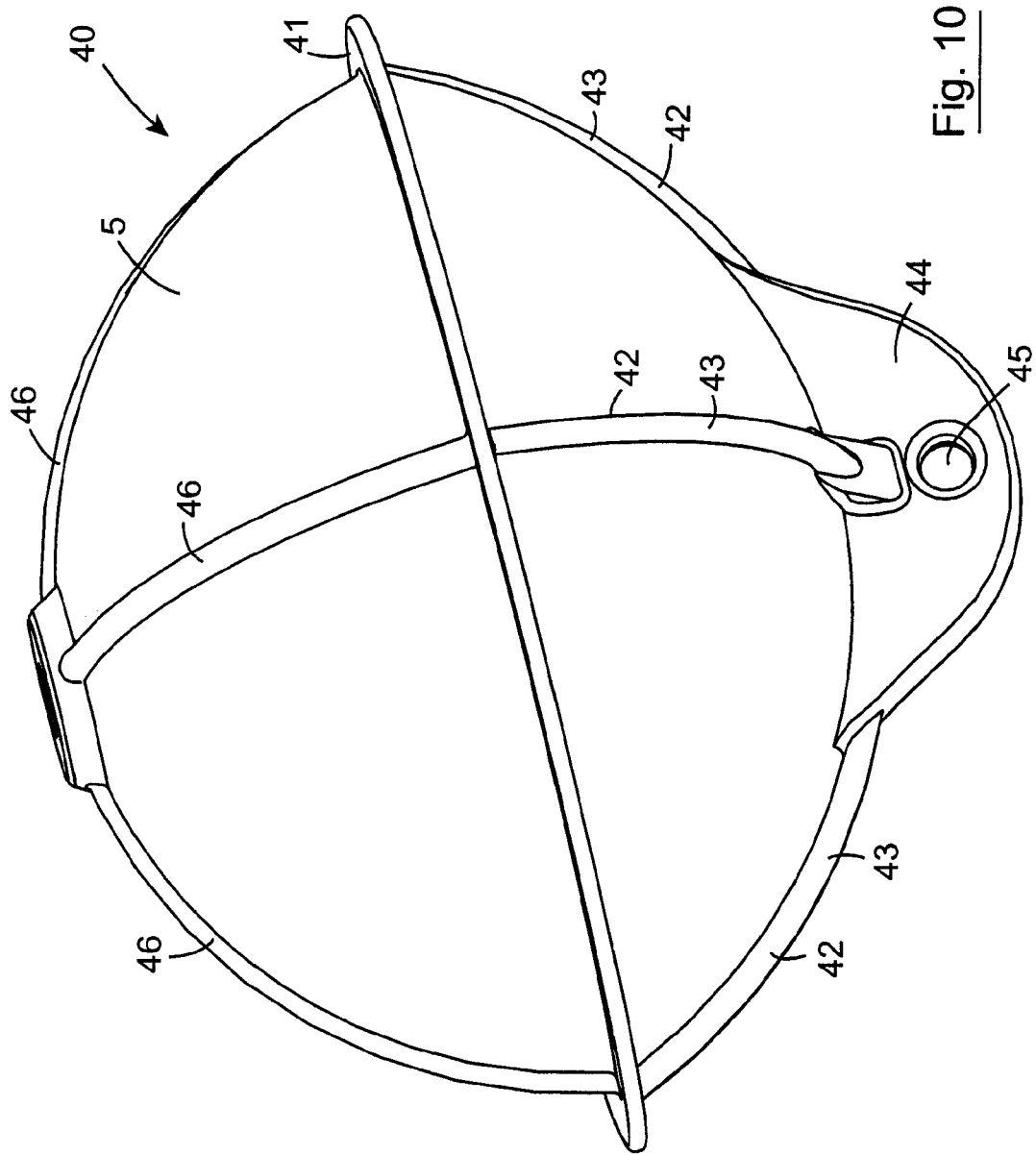
Figure 11:
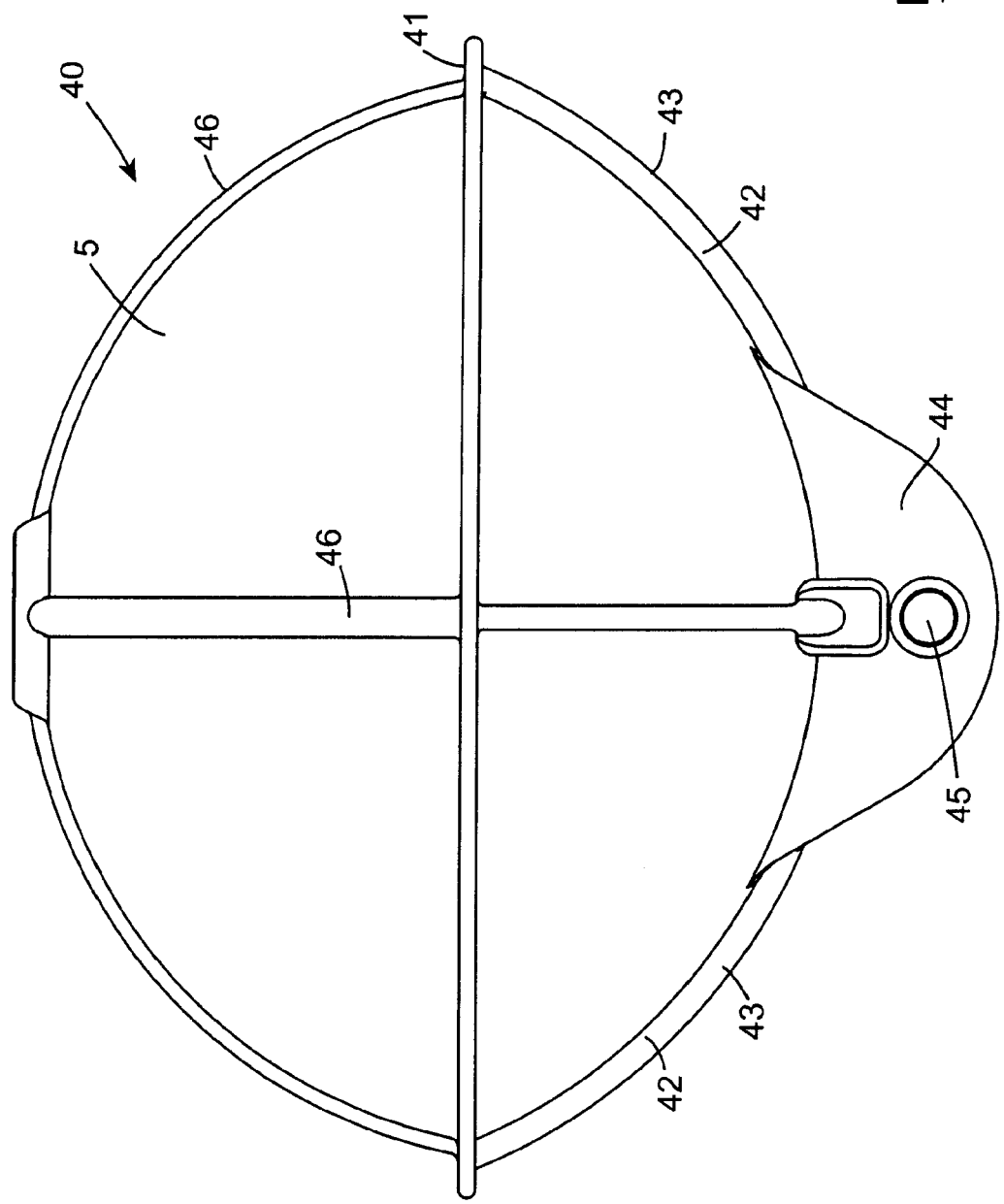
Figure 12:
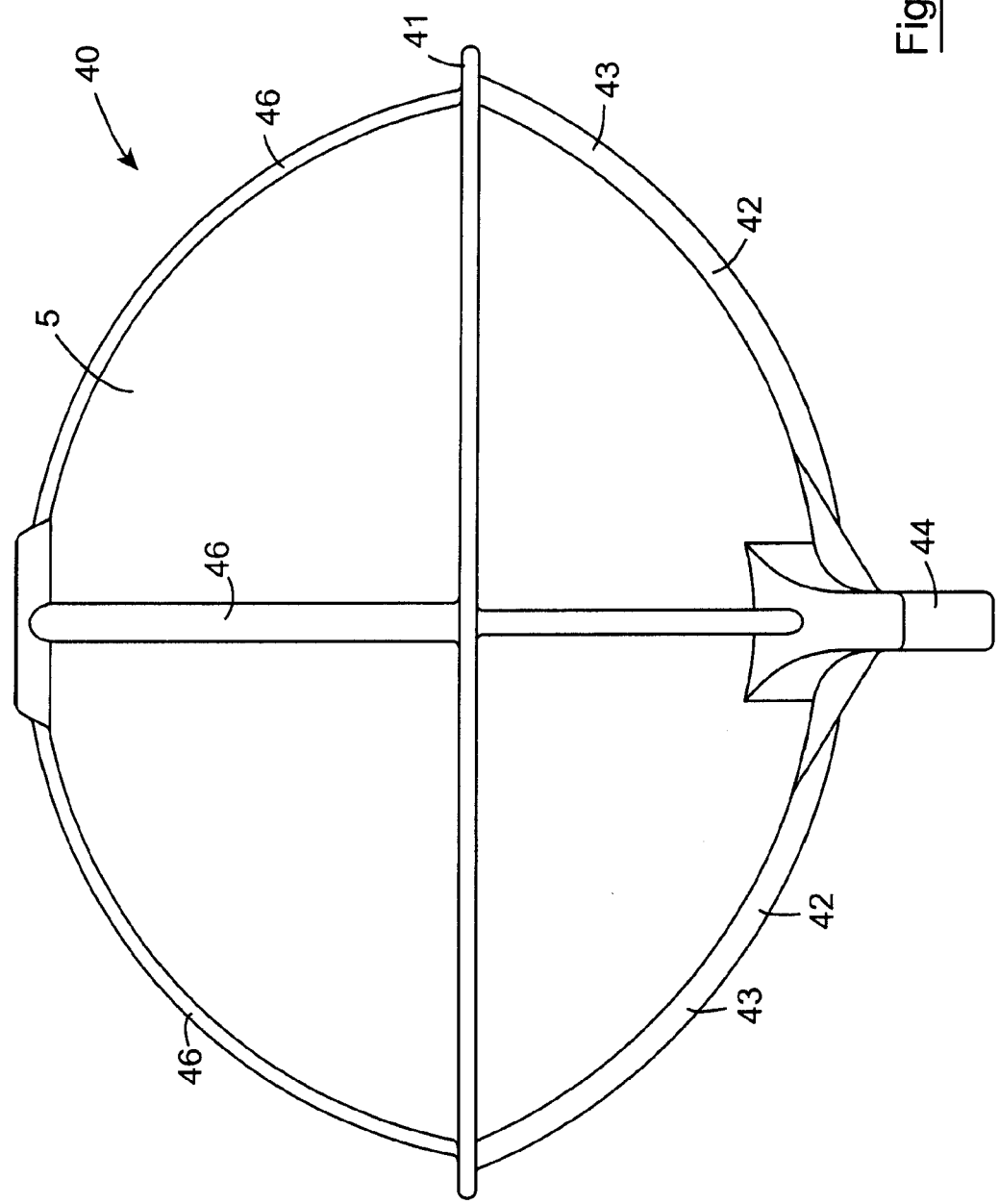
Figure 13:
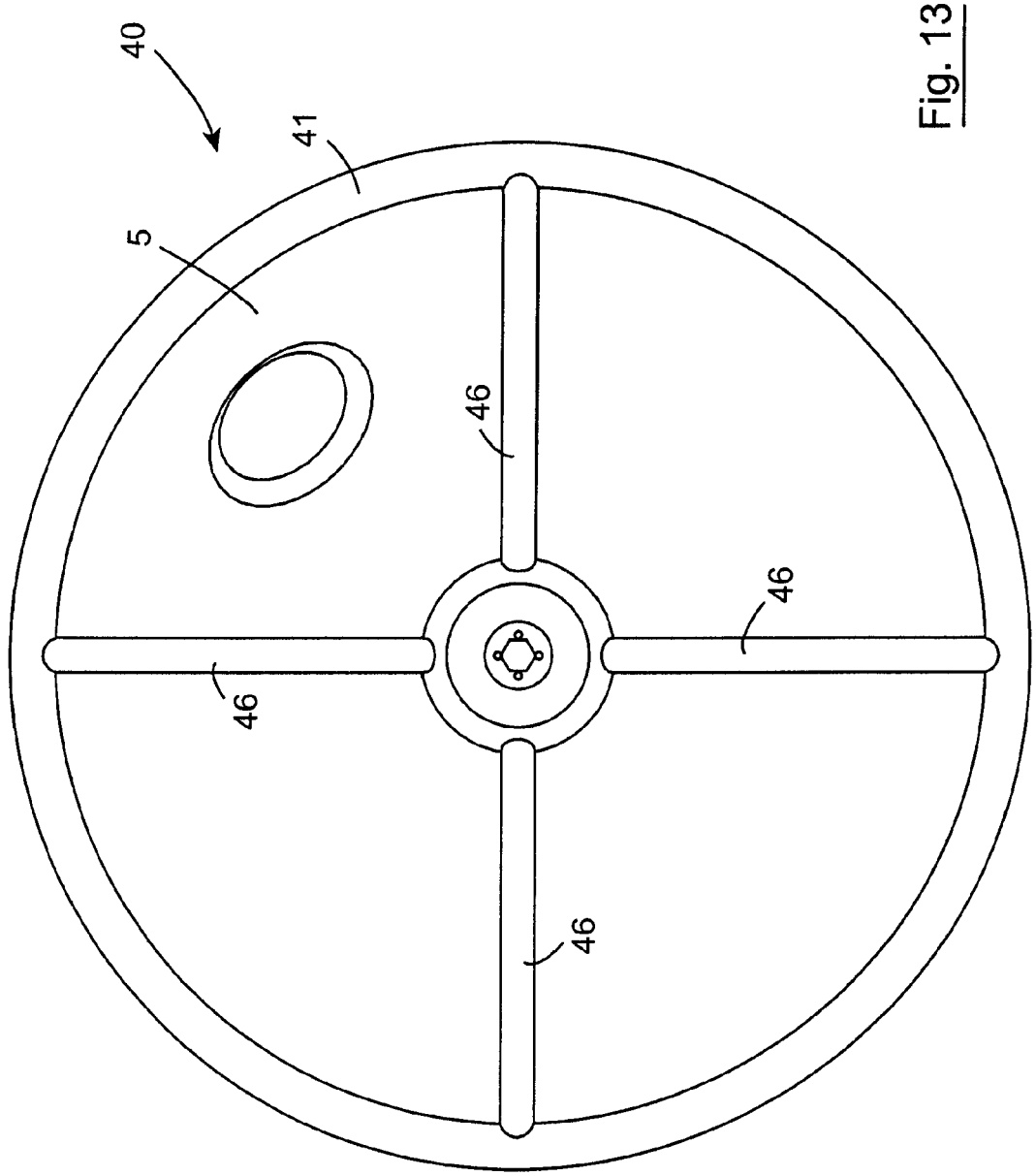
Figure 14:
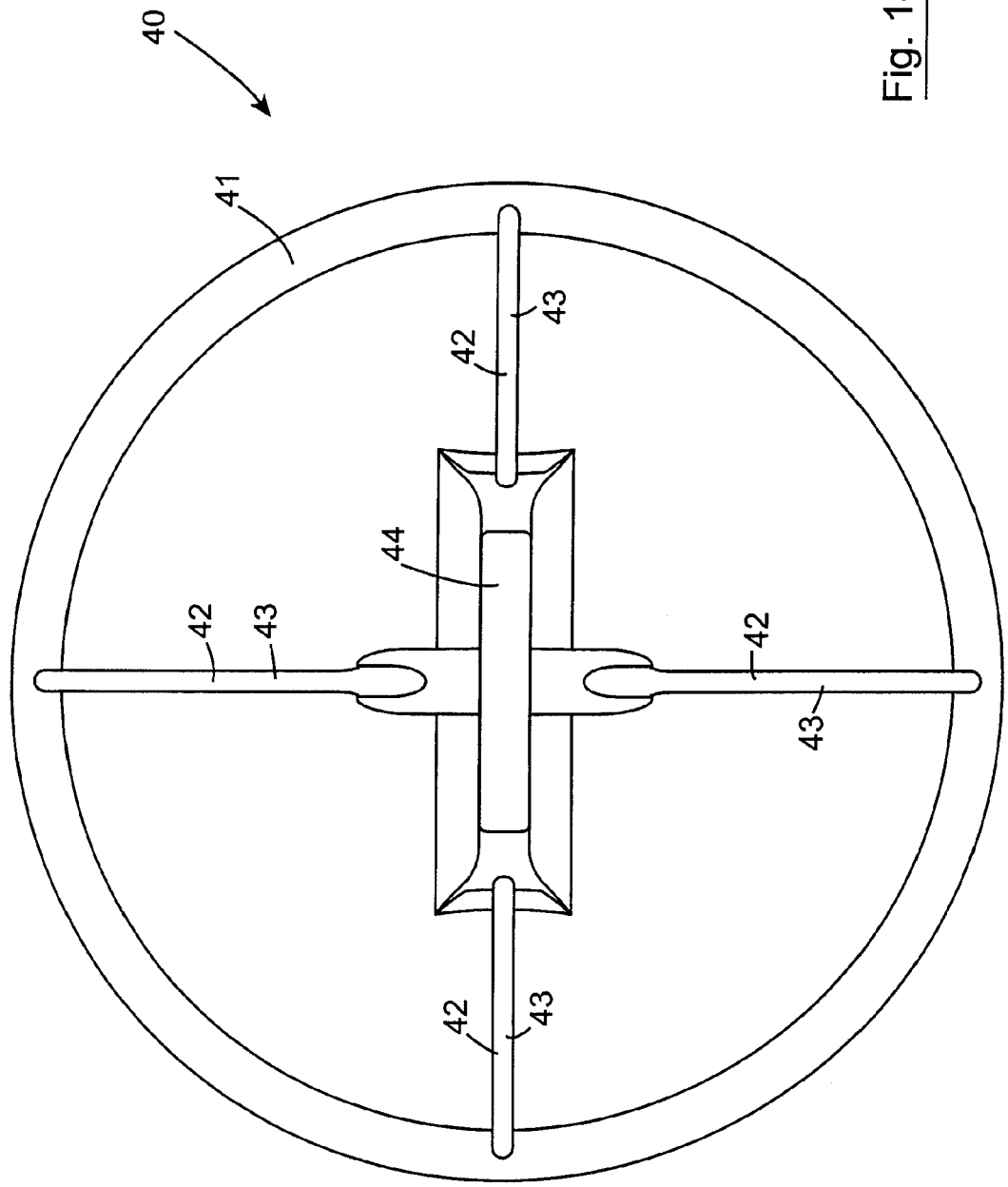
Figure 15:
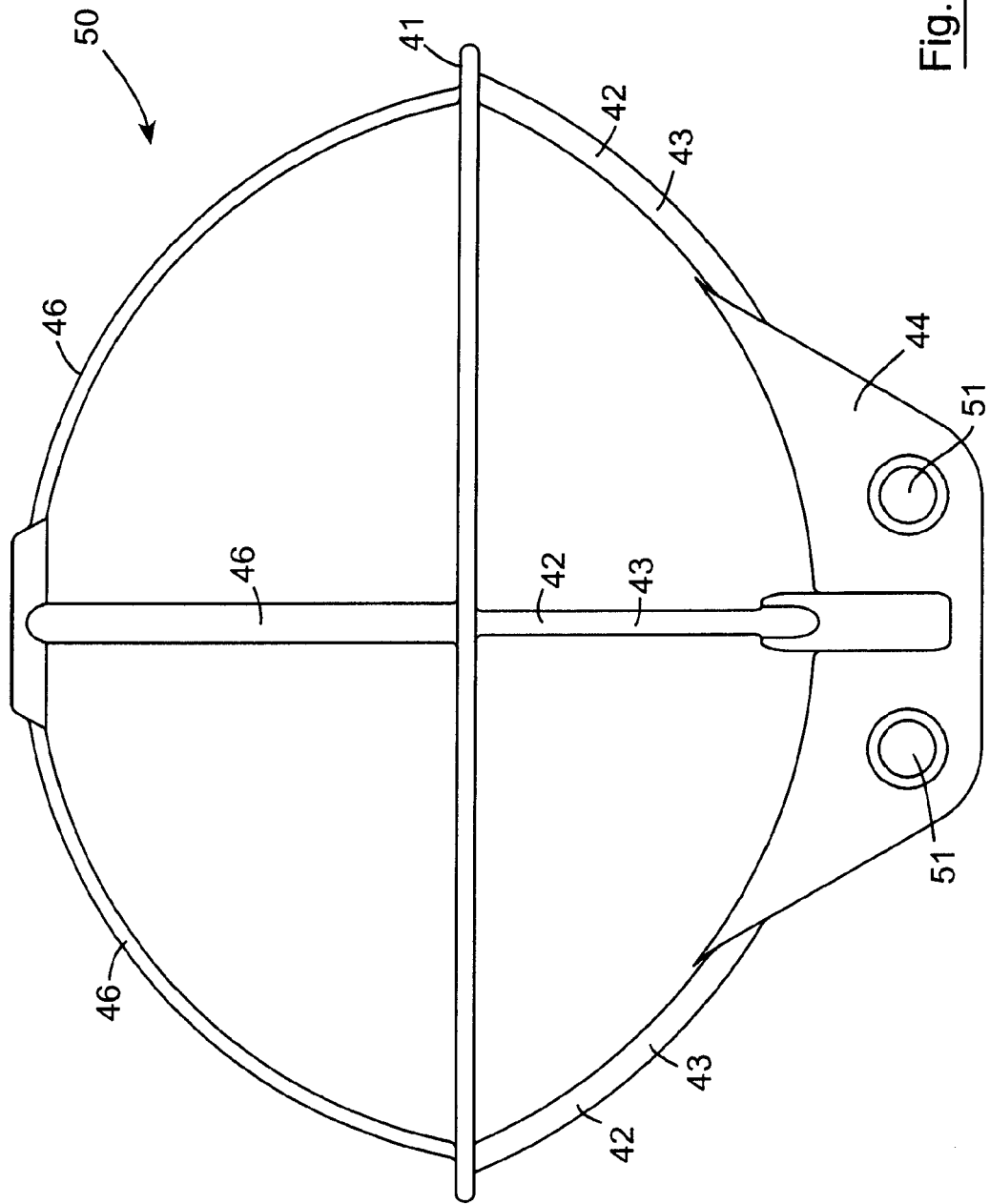
Figure 16:
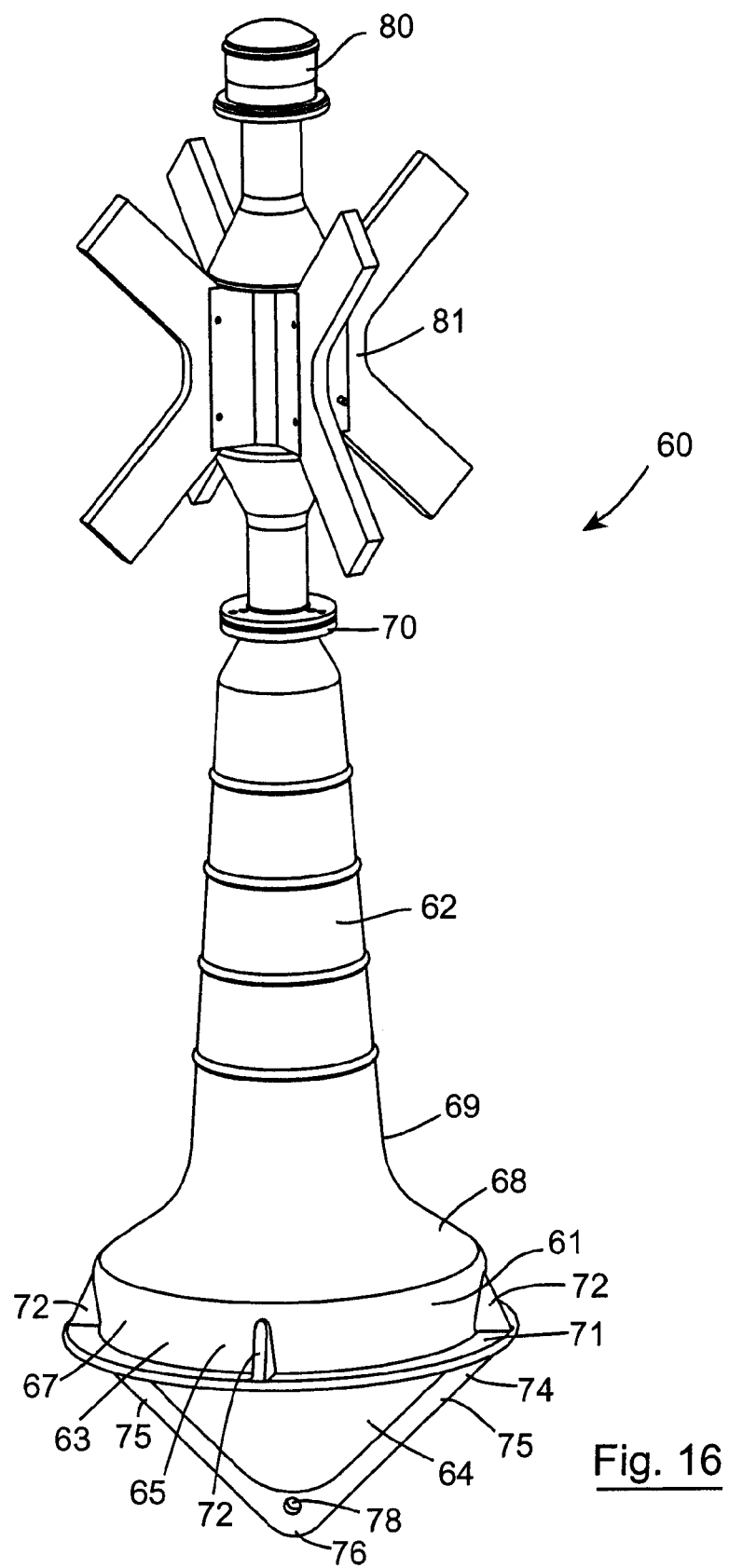
Figure 17:
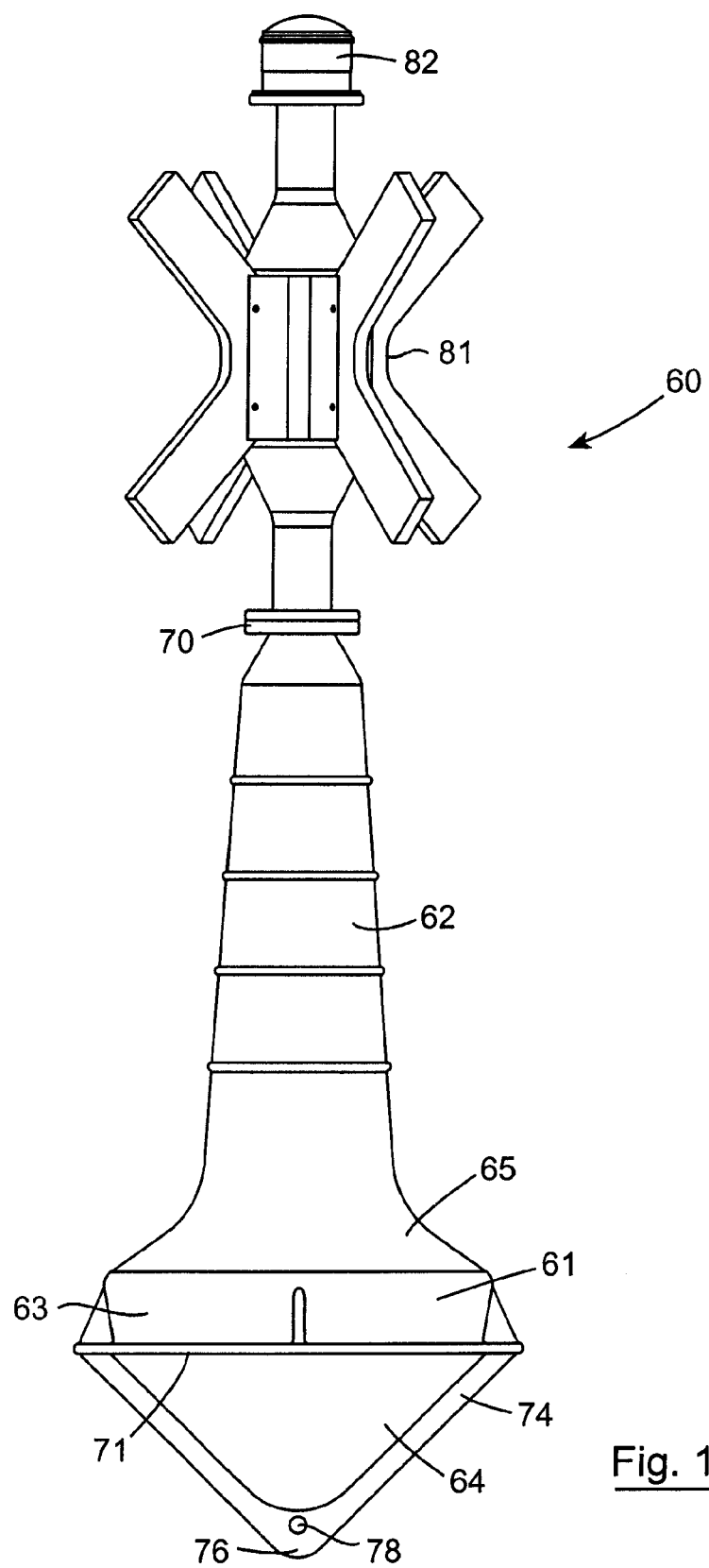
Figure 18:
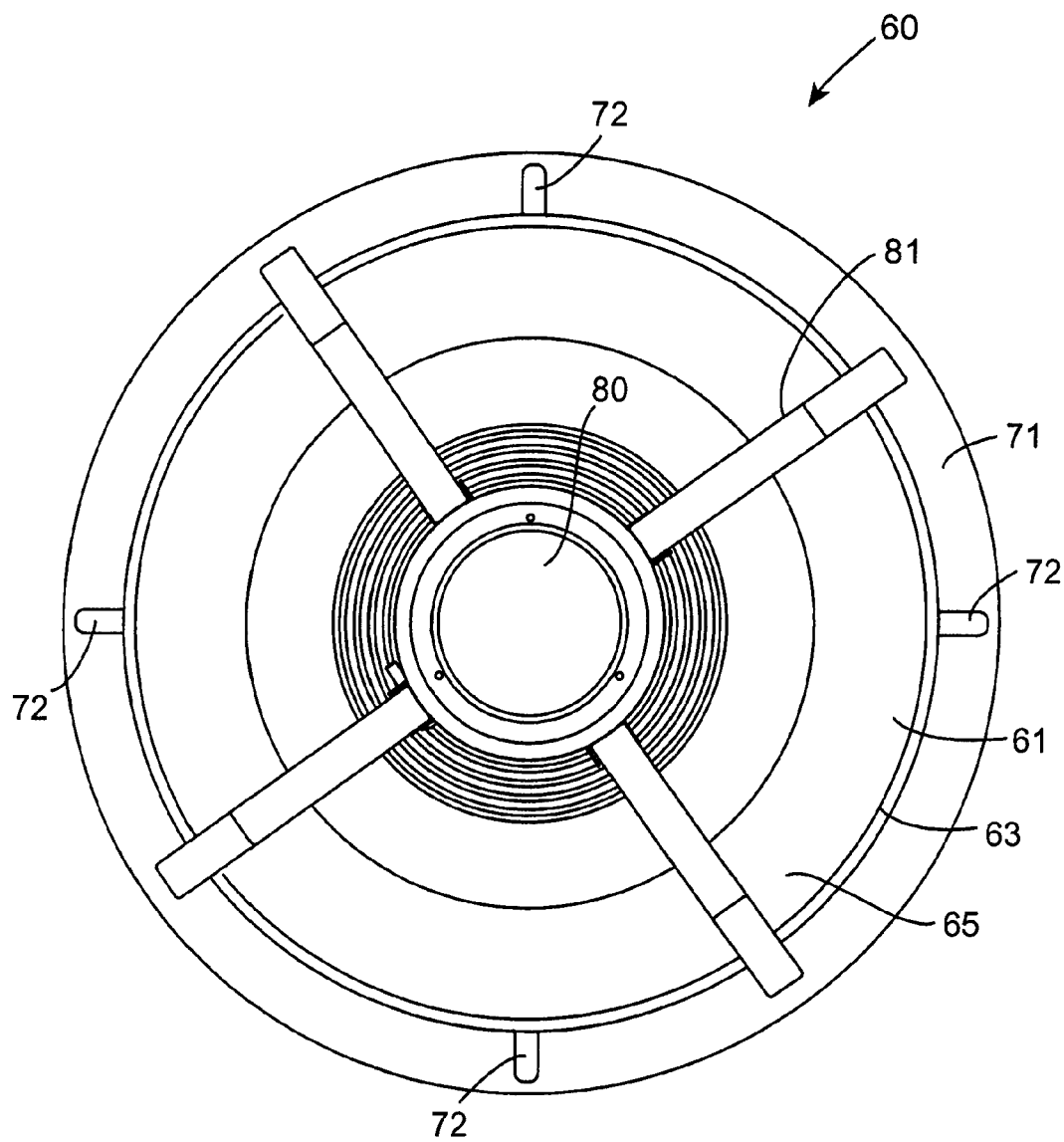
Figure 19:
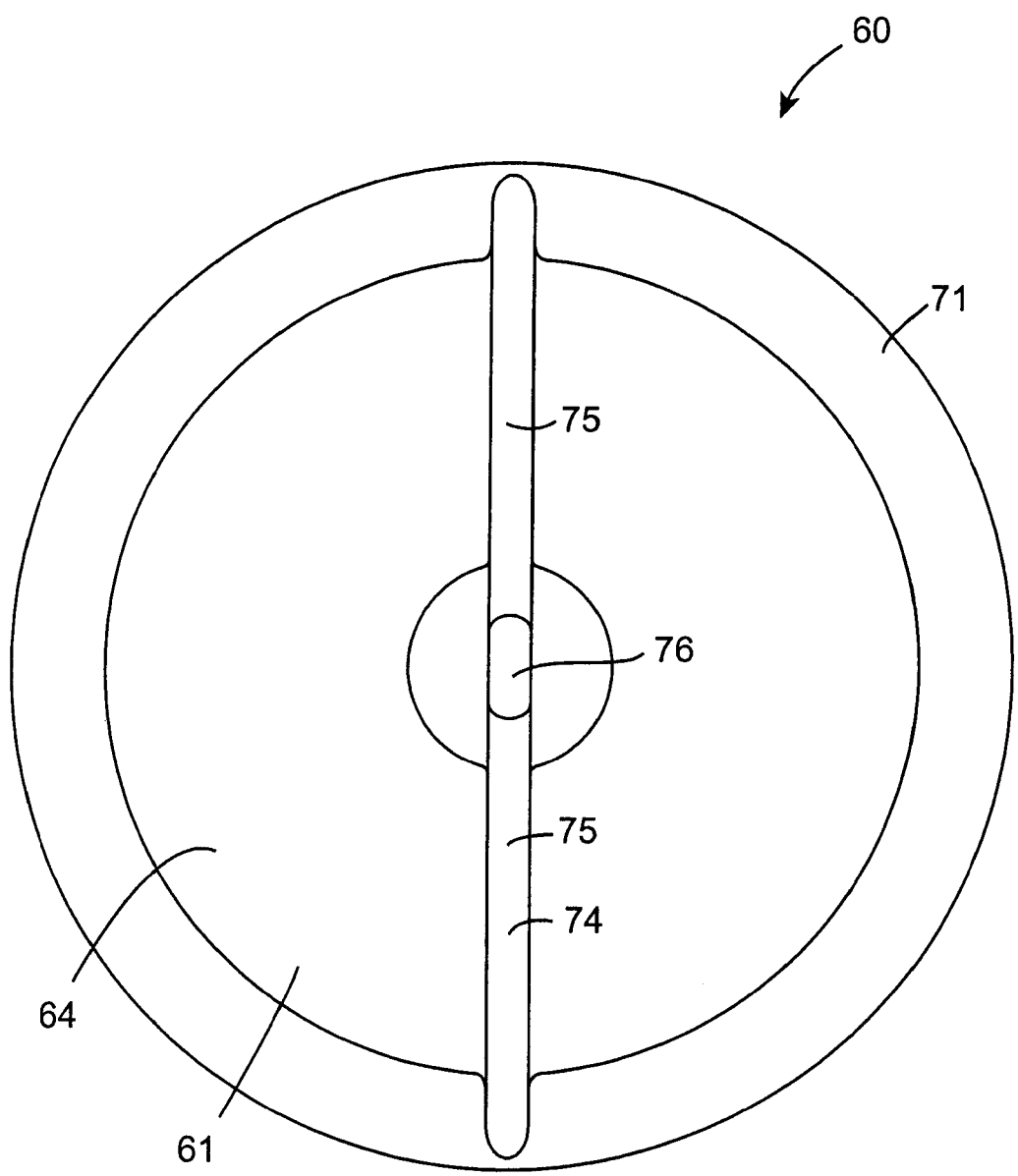
Figure 20:
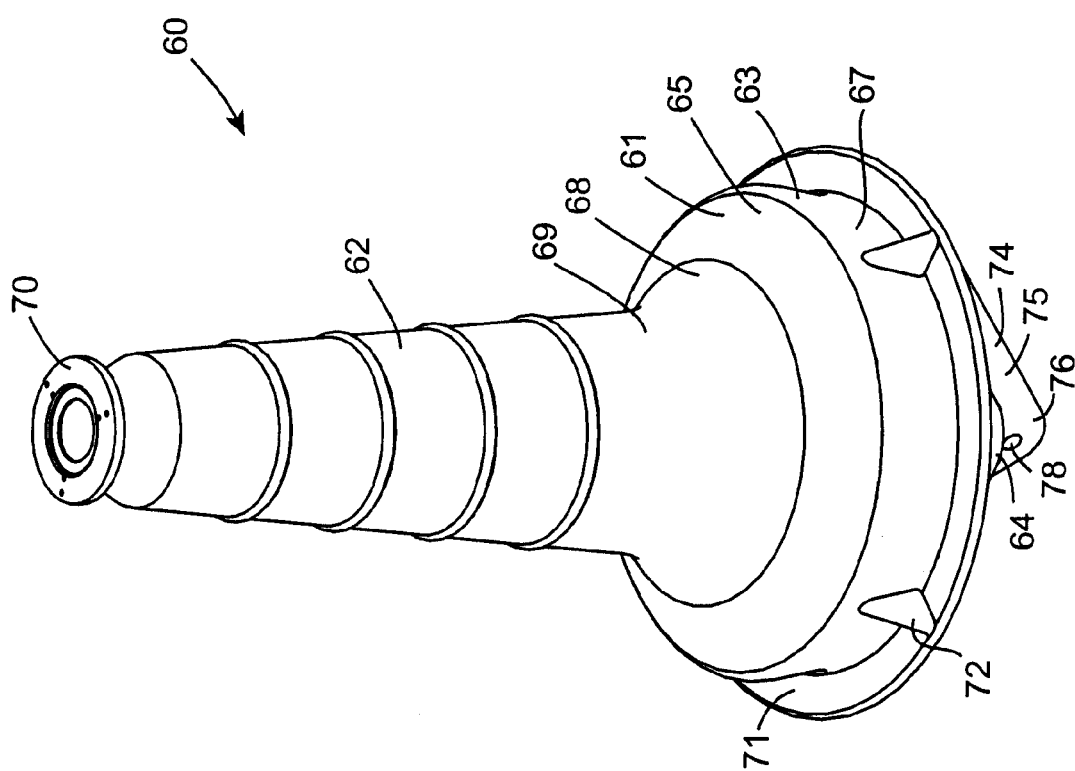
Figure 21:
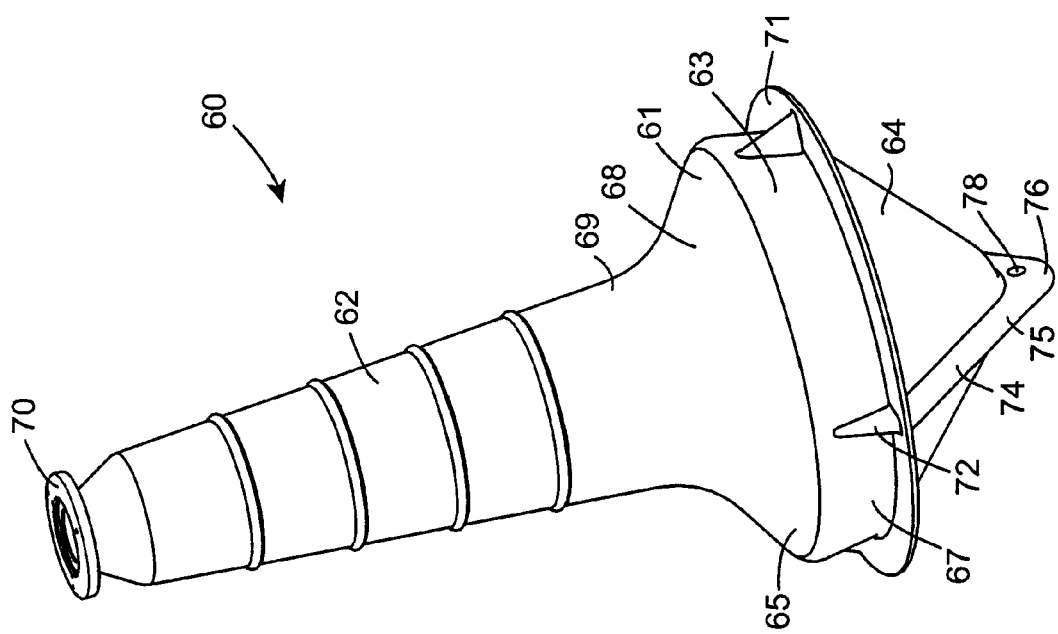

FIG. 10 is a perspective view of a float according to another embodiment of the invention, FIG. 11 is a front elevational view of the float of FIG. 10, FIG. 12 is a side elevational view of the float of FIG. 10, FIG. 13 is a top plan view of the float of FIG. 10, FIG. 14 is an underneath plan view of the float of FIG. 10, FIG. 15 is a perspective view of a float according to a further embodiment of the invention, FIG. 16 is a perspective view of a navigational buoy according to the invention, FIG. 17 is a front elevational view of the navigational buoy of FIG. 16, FIG. 18 is a top plan view of the navigational buoy of FIG. 16, FIG. 19 is an underneath plan view of the navigational buoy of FIG. 16, FIG. 20 is a perspective view of a portion of the navigational buoy FIG. 16, and FIG. 21 is another perspective view of the portion of the navigational buoy of FIG. 16.

Figure 1:
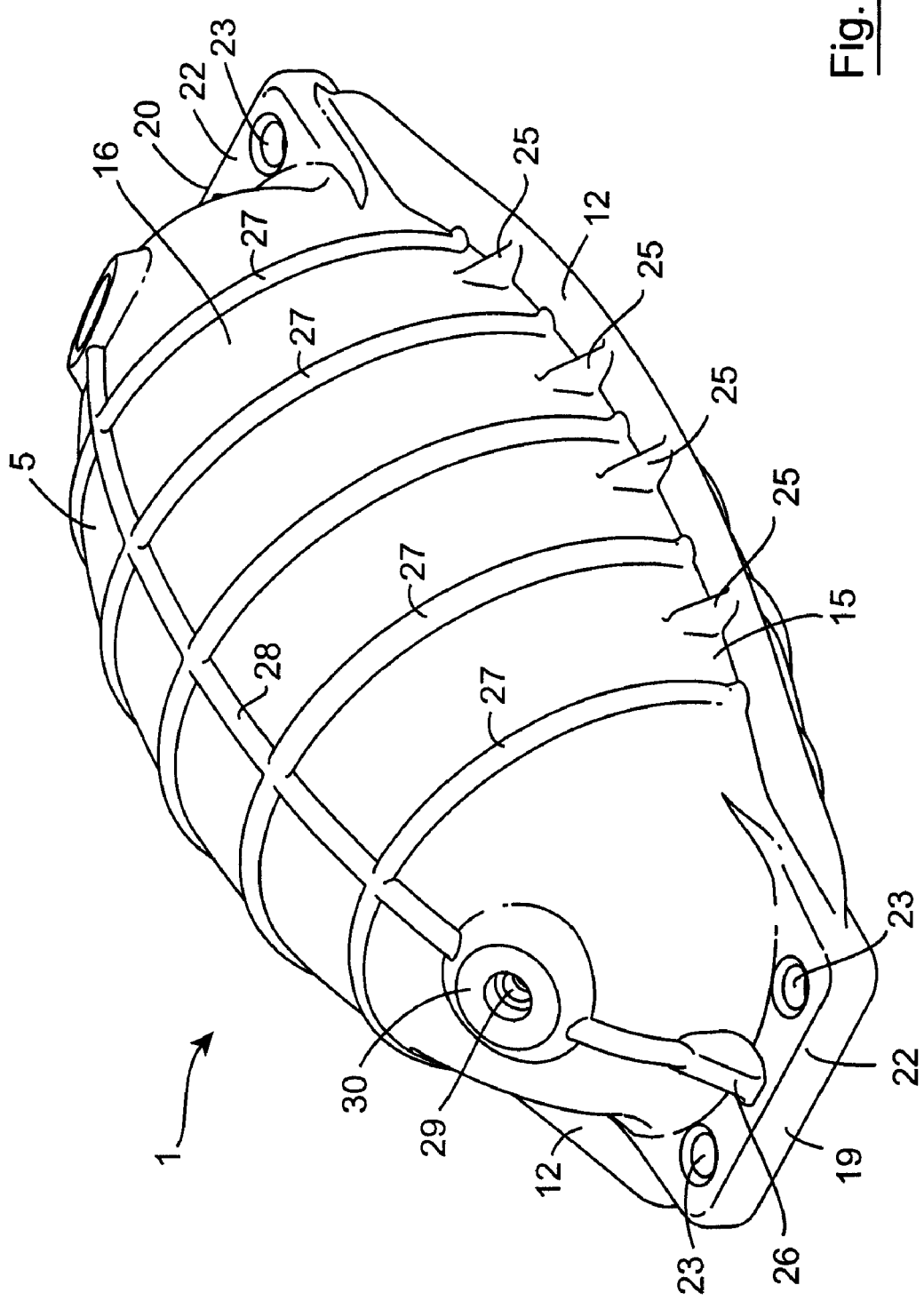
FIG. 1 is a top perspective view of a float according to the invention.
Figure 2:
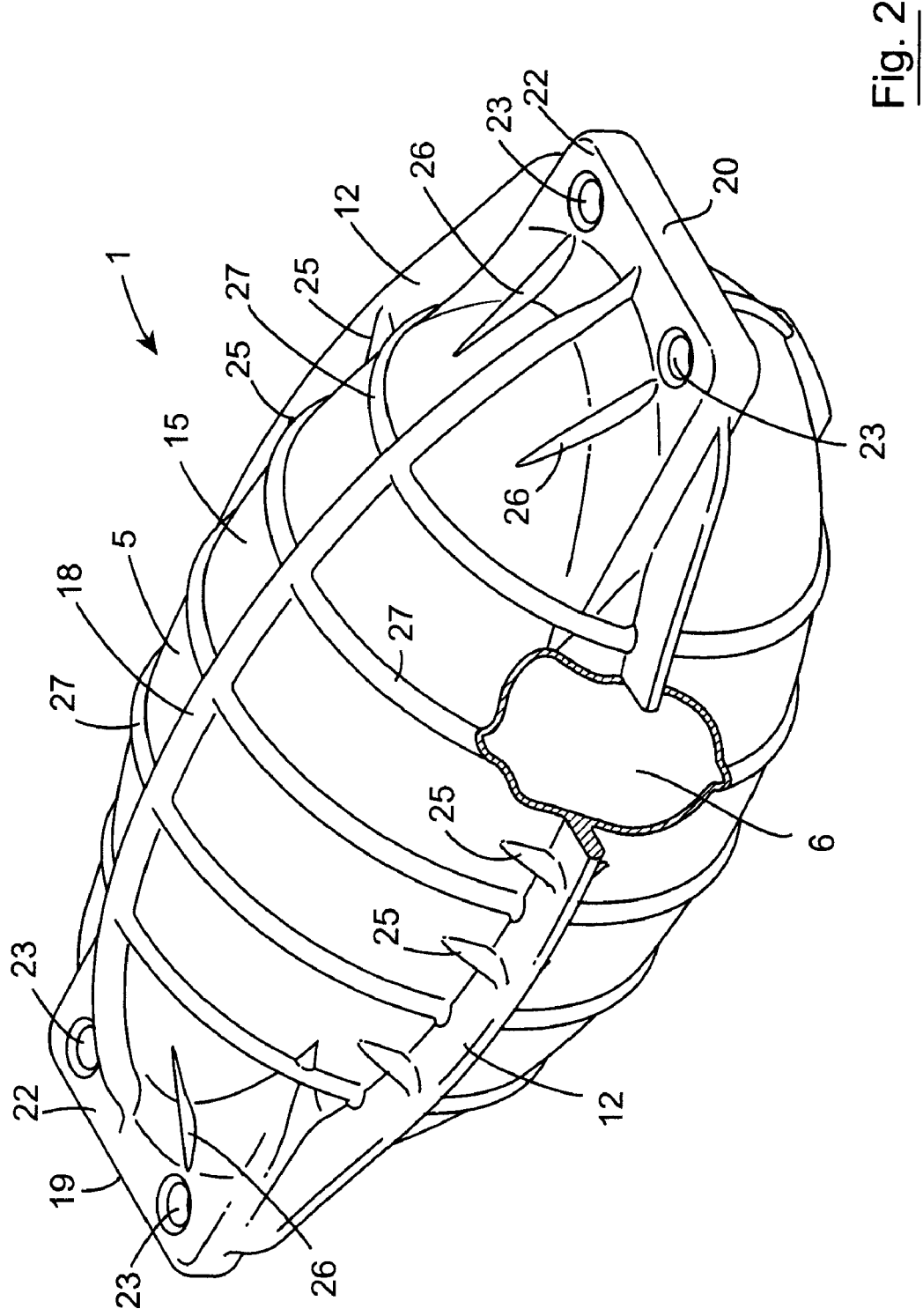
FIG. 2 is a partly cutaway underneath perspective view of the float of FIG. 1.
Figure 3:
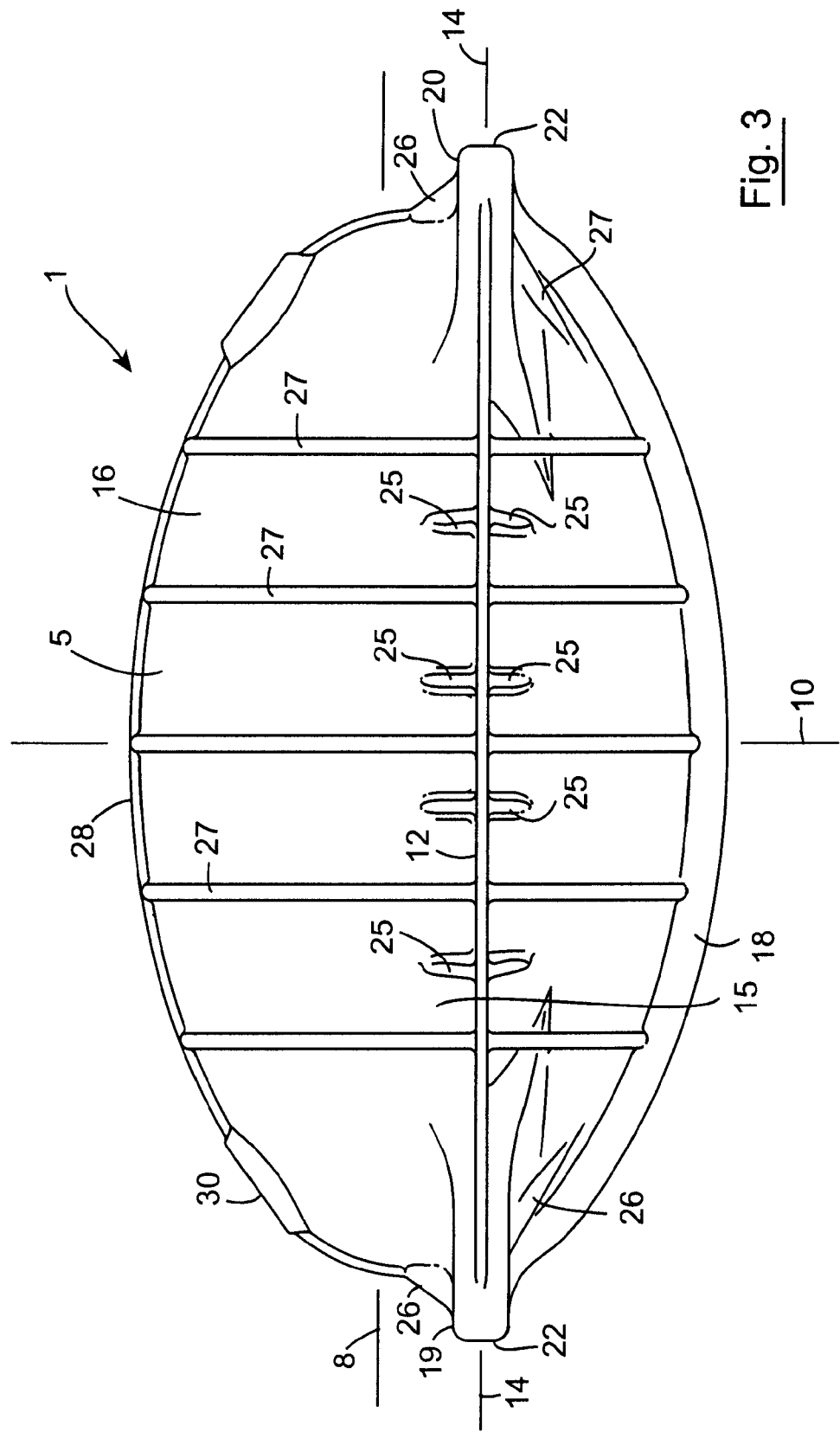
FIG. 3 is a side elevational view of the float of FIG. 1.
Figure 4:
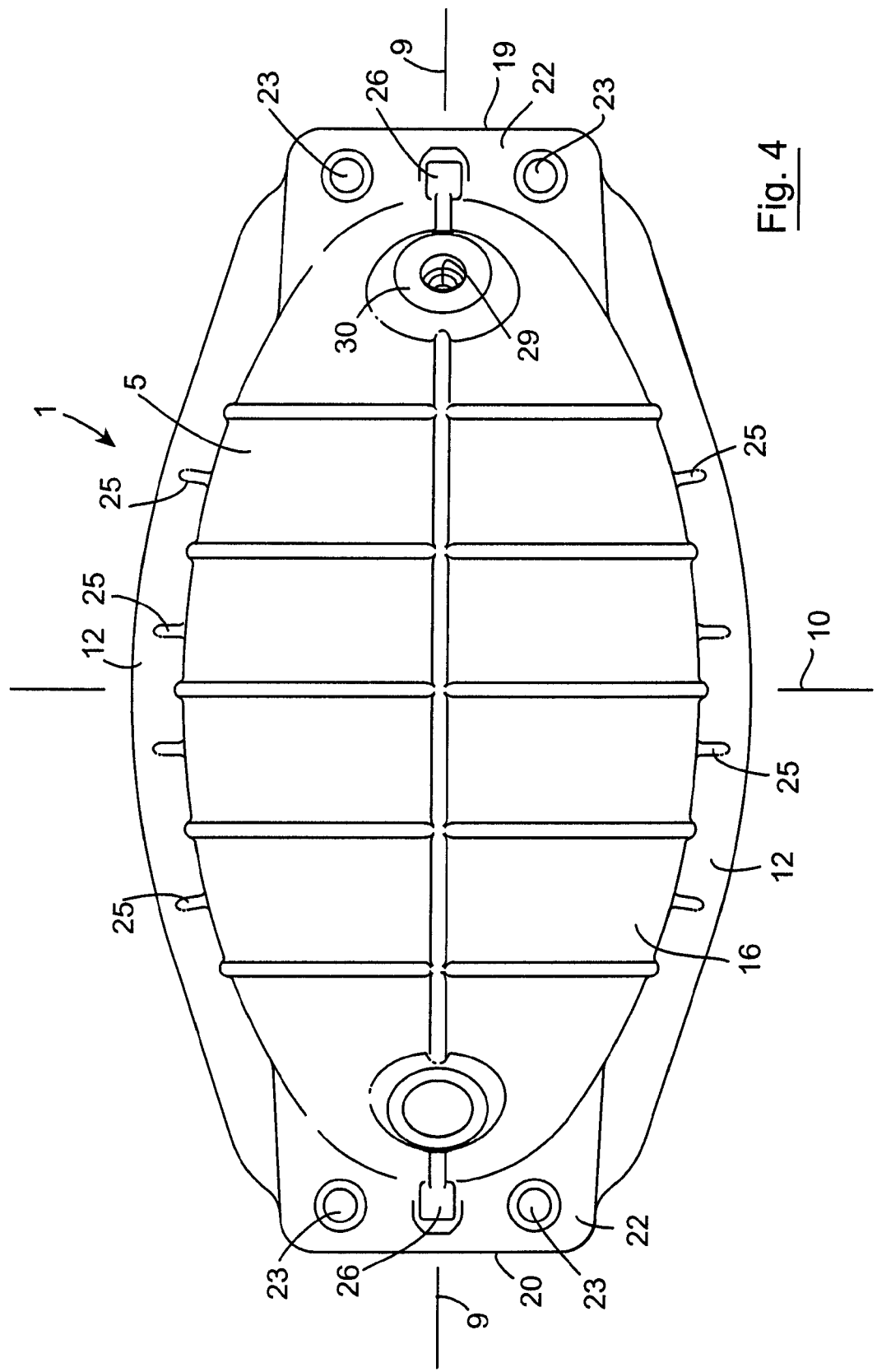
FIG. 4 is a top plan view of the float of FIG. 1.
Figure 5:
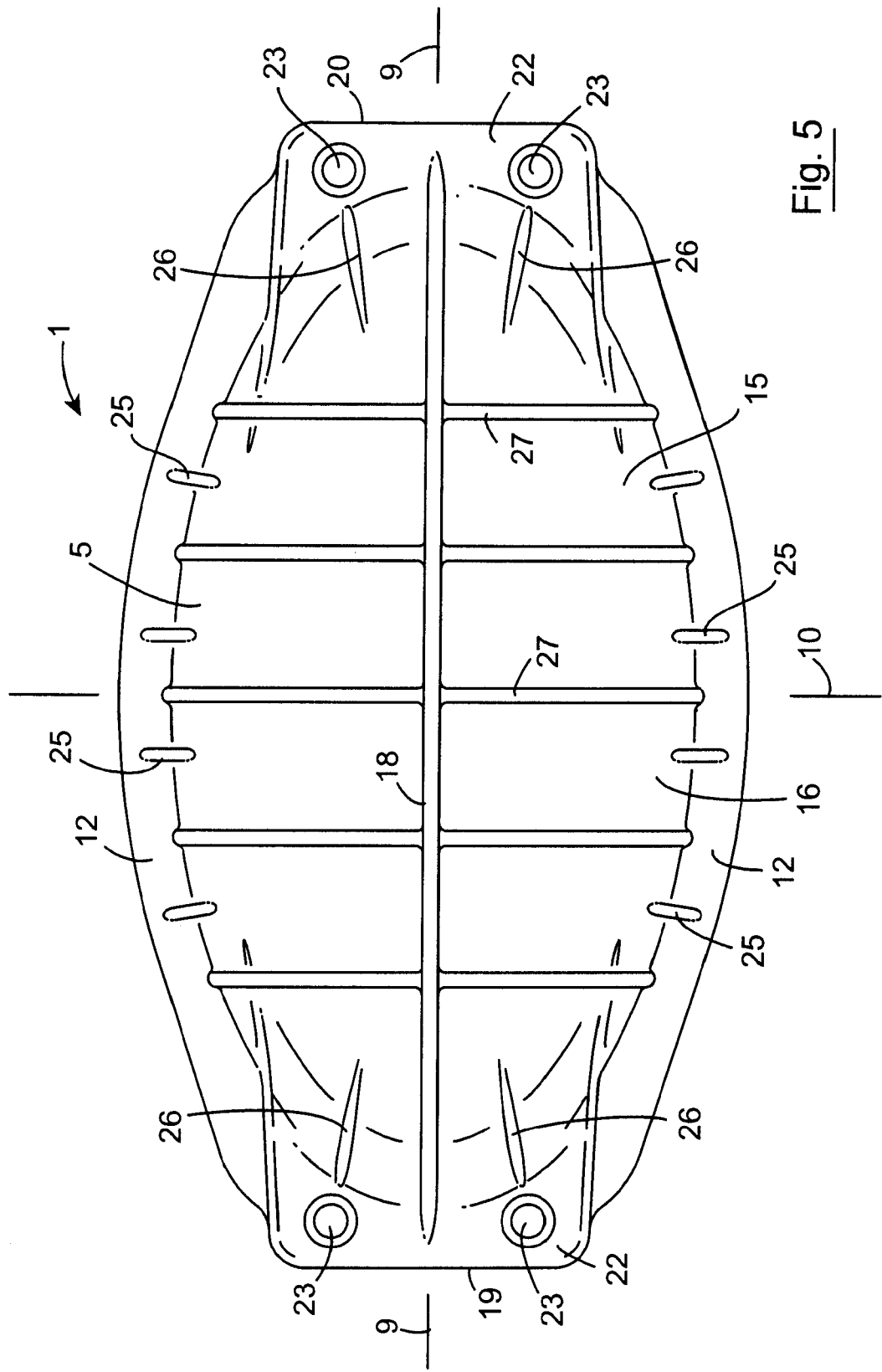
FIG. 5 is an underneath plan view of the float of FIG. 1.
Figure 6:
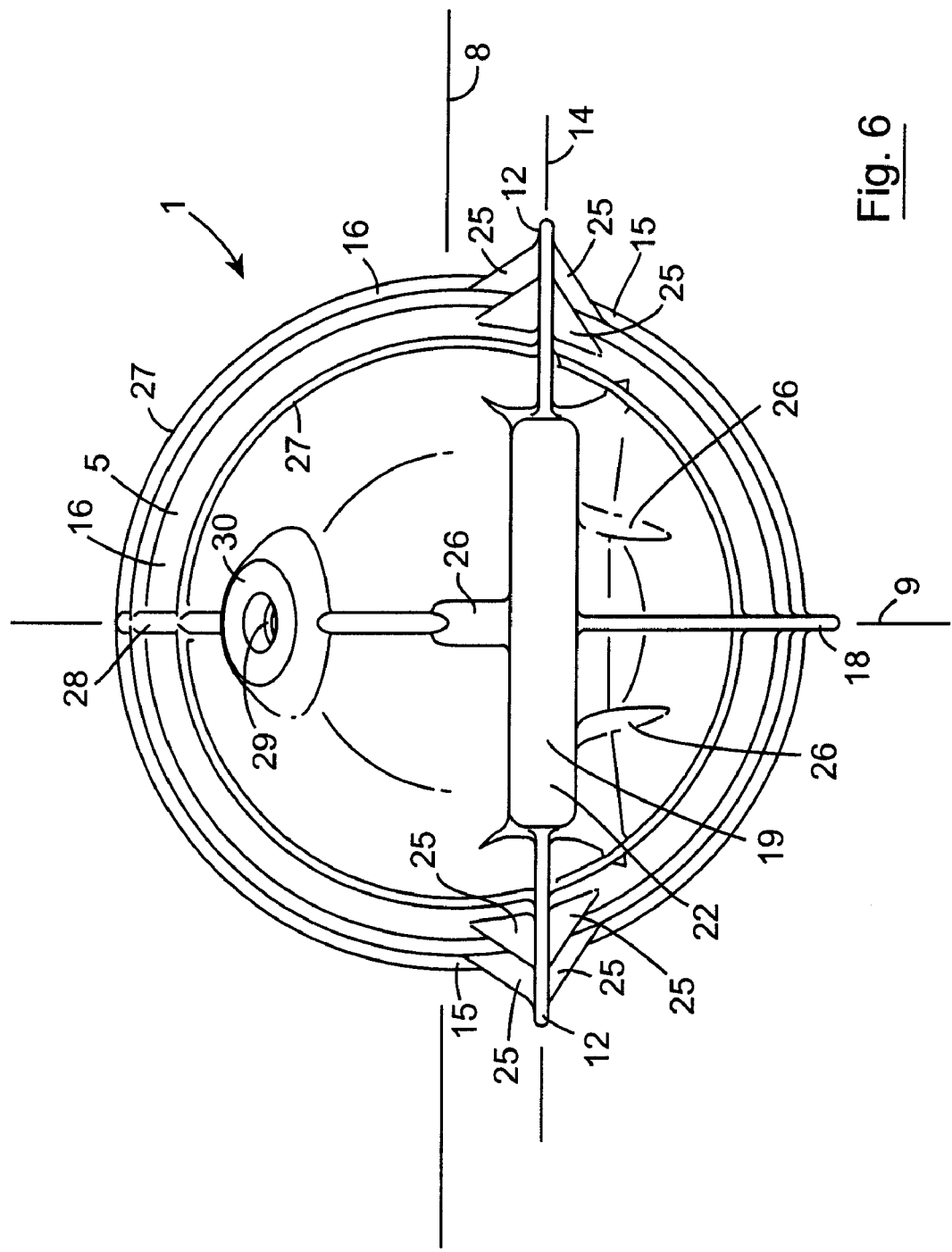
FIG. 6 is a front end elevational view of the float of FIG. 1.
Figure 7:
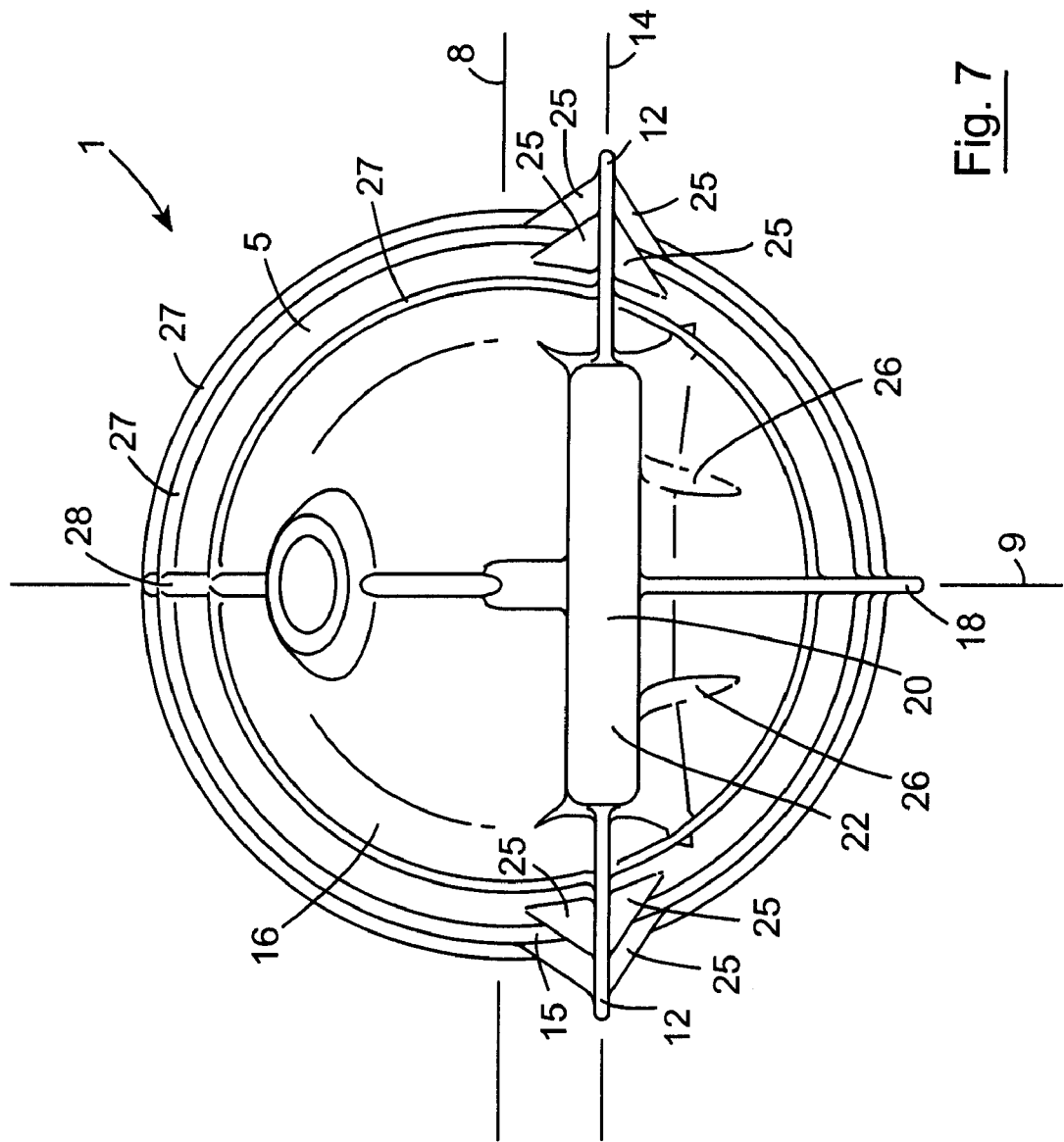
FIG. 7 is a rear end elevational view of the float of FIG. 1.
Figure 8:
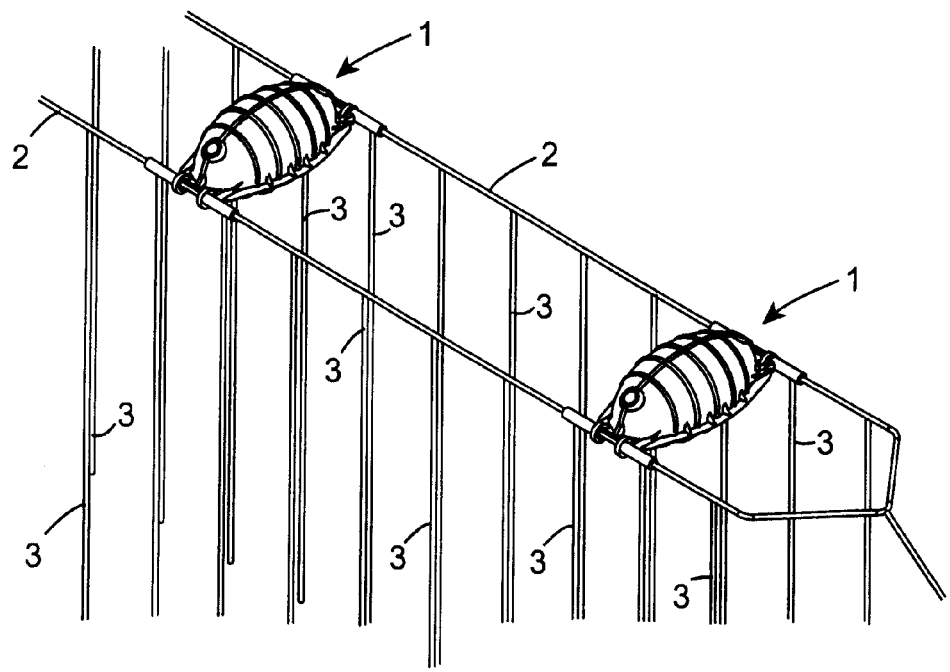
FIG. 8 is a perspective view of a plurality of the floats of FIG. 1 in use.
Figure 9:
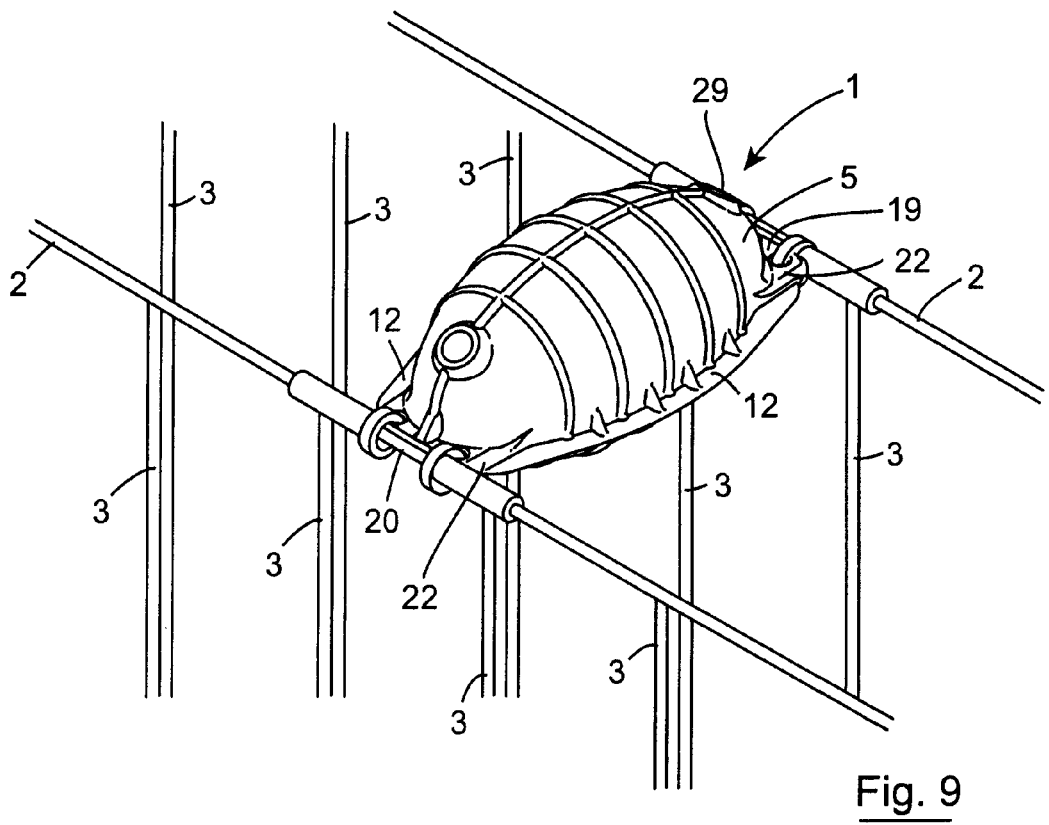
FIG. 9 is an enlarged perspective view of one of the floats of FIG. 1, in use.

Referring to the drawings and initially to FIGS. 1 to 9 there is illustrated a float according to the invention indicated generally by the reference numeral 1, which in this embodiment of the invention is suitable for use in the growing of marine molluscs, and in particular for use in commercial mussel growing, for locating and coupling between a pair of longitudinally extending spaced apart parallel tethering ropes 2 and for suspending crop ropes 3 impregnated with mussel spawn submersed in seawater on which mussels are grown, see FIGS. 8 and 9. The float 1 in this embodiment of the invention is of plastics material, and may be of low-density polyethylene or high-density polyethylene material and is formed by rotational moulding, although the float may be formed by blow moulding or by other suitable plastics materials forming processes. The float 1 comprises a hollow ovoid shell 5 which defines an airtight hollow interior region 6, and the shell 5 is of strength sufficient to withstand the hollow interior region 6 being pressurised by compressed air to a pressure of approximately two atmospheres. The shell 5 defines first and second major central planes 8 and 9 which are perpendicular to each other, the first major central plane 8 extending horizontally, in use, and coinciding with a plane, which in use extends longitudinally through the float 1 at its maximum horizontal longitudinal cross-sectional area, and the second major central plane 9 extending vertically, in use, and coinciding with a plane which in use extends longitudinally through the float 1 at its maximum vertical longitudinal cross-sectional area. The normal waterline of the float 1 defines a third horizontal plane, in use, which in this embodiment of the invention coincides with the first major central plane. A fourth plane, which in this embodiment of the invention is a minor central plane 10 defined by the shell 5 coinciding with a plane extending transversely through the float 1 at its maximum vertical transverse cross-sectional area in use, extends perpendicularly to both the first and second major central planes 8 and 9.

A damping means for damping upward and downward vertical movement of the float 1 comprises a damping plate 12 extending laterally outwardly from and around the shell 5. The damping plate 12 defines a first plane 14 which extends parallel to the first major central plane 8 and is spaced apart below the first major central plane 8. Thus in this embodiment of the invention the damping plate 12 extends from a lower portion 15 of the surface 16 of the shell 5, which, in use, in general, is below the normal waterline of the float and is submersed. Accordingly, the damping plate 12 is in normal use located within the water for damping upward buoyant movement of the float 1 in the water. However, prior to commencement of growing of the crop and during the early stages of crop growth, when the weight of the crop ropes is less than their weight as the crop develops, the damping plate may not be submerged in calm water.

A longitudinally extending keel 18 extends radially outwardly and downwardly from the shell 5 from a front end 19 to a rear end 20 of the shell 5 for minimising rolling of the float 1 in water. The keel 18 defines a keel plane which coincides with the second major central plane 9, and accordingly, the keel plane defined by the keel 18 is perpendicular to the first plane 14 defined by the damping plate 12.

A pair of coupling means comprising a pair of coupling plates 22 extend axially outwardly at the respective front and rear ends 19 and 20 of the shell 5 for coupling the float 1 to the tethering ropes 2. The coupling plates 22 are located in and form part of the damping plate 12 at the respective front and rear ends 19 and 20 of the float 1. Two bores 23 extend through each coupling plate 22 for coupling the float 1 to the tethering ropes 2. The keel 18 extends from and between the respective coupling plates 22.

A plurality of spaced apart radially extending first reinforcing fillets 25 reinforce the joint of the damping plate 12 to the shell 5. Second reinforcing fillets 26 at the front and rear ends 19 and 20 reinforce the joints of the coupling plates 22 to the shell 5. A plurality of reinforcing hoop ribs 27 extend around the shell 5, and define respective planes which extend parallel to the minor central plane 10. A longitudinally extending reinforcing rib 28 extends along the top of the shell 5 from the front end 19 to the rear end 20 for strengthening the shell 5.

A valving means, namely, a valve 29 is located in a boss 30 for facilitating pressurising the hollow interior region 6 with compressed air.

In use a plurality of the floats 1 are pressurised with compressed air to a pressure of two atmospheres. The floats 1 are tethered at spaced apart intervals along and between a pair of longitudinally extending spaced apart parallel tethering ropes 2 by securing the tethering ropes 2 to the coupling plates 22 for supporting the tethering ropes 2 in the water. The tethering ropes 2 as will be understood by those skilled in the art are secured at respective opposite ends to suitable moorings. Crop ropes 3 impregnated with mussel spawn are secured at spaced apart intervals to the respective tethering ropes 2, and depend downwardly therefrom, and are submerged in the sea. The damping plate 12 as mentioned above extends from the submersible portion 15 of the float 1, and with each float 1 coupled to the tethering ropes 2 with its keel 18 extending downwardly, in general, the damping plate 12 is submersed in the water.

When the floats 1 are subjected to stormy conditions with relatively high waves, the floats 1 become submerged and may become submerged to depths of up to twenty metres and more, although the damping plate 12 also damps downward movement of the floats 1, and thus the floats 1 are not submerged to the same depths as floats known heretofore for the same sea conditions. However, the upwardly directed buoyant propulsion force acting on the floats 1 which urge the floats 1 upwardly from such depths is significantly damped by the damping plate 12, and upward movement of the floats 1 under the action of the buoyant propulsion force is retarded, thereby avoiding the floats 1 being propelled out of the water as they are being returned to their normal flotation level.

The performance of a float according to this embodiment of the invention of size of 400 liters was tested against a similar float without a damping plate. The width of the damping plate 12 of the float according to the invention was 6.25 cm. Both floats were submerged to a depth of one metre in water. The float without the damping plate rose to the surface one second after being released, while the float according to this embodiment of the invention took three seconds to reach the surface after being released. Accordingly, the provision of the damping plate significantly retards upward movement of the float according to the invention.

Even in exceptionally stormy conditions if the damping provided by the damping plate 12 is insufficient to prevent the floats 1 being propelled from the water, the speed at which the floats are propelled from the water is sufficiently retarded that any travel of the floats 1 above the surface of the water is sufficiently retarded, and the height to which the floats 1 travel out of the water is sufficiently reduced to minimise the danger of mussels growing on the crop ropes 3 being shaken from the ropes 3.

Additionally, the damping plate 12 by limiting the amount of upward and downward movement of the floats, brushing of the crop ropes against each other is either eliminated or at least significantly reduced, and therefore, loss of mussels from the crop ropes 3 by inter-rope friction is also eliminated, or at least significantly reduced over and above systems known heretofore. It should be noted that all references to downward movement of the floats according to the invention are to be understood as being downward movement of the floats relative to the surface of the water and to the surface of a wave.

By pressurising the hollow interior region 6 of the shell 5 of the floats 1 to two atmospheres any danger of the floats 1 collapsing under pressure at relatively deep depth is minimised, and in general, avoided.

By providing the keel 18 on the floats 1, rolling of the floats 1 in the water is minimised, and accordingly, the damping plate 12 of the floats 1 is therefore retained extending substantially horizontally from the shell 5 of the floats 1 at virtually all times, thus maximising the vertical damping effect of the damping plate 12 on each float 1.

Additionally, by locating the coupling plates 22 to form part of the damping plate 12 of each float, the coupling plates 22 are located on the submersible portion of the surface of the floats 1, and thus, in normal operation are below the water line of the floats 1. This provides the added advantage that since the tethering ropes 2 are coupled to the coupling plates 22 which are below the water line, the tethering ropes 2 are also located below the water line, and thus, there is little or no danger of floating debris chaffing or cutting the tethering ropes 2. This is a particular advantage in arctic and semi-arctic waters where floating ice can have a serious detrimental chaffing action on tethering ropes where the tethering ropes extend from the floats at a level at or above the water line of the floats. Additionally, by virtue of the fact that the tethering ropes extend from the floats below the water line of the floats, the crop ropes similarly are suspended from the tethering ropes below the surface of the water, and thus, there is little or no danger of floating debris, ice or the like chaffing the crop ropes.

It is envisaged that where the floats according to the invention are provided for mussel growing, they will be provided in sizes of from 250 liters to 400 liters, and may be provided in larger or smaller sizes. Typically, the width of the damping plate will be dependent on the size of the float, and in general, will range from 5 cm to 8 cm.

Referring now to FIGS. 10 to 14 there is illustrated a float according to another embodiment of the invention indicated generally by the reference numeral 40. The float 40 is somewhat similar to the float 1 and similar components are identified by the same reference numeral. The main difference between the float 40 ant the float 1 is in the shape of the float, and the location of the coupling plate. In this embodiment of the invention the float 40 comprises a hollow shell 5 which is formed of plastics material by rotational moulding, and is substantially spherical. When viewed in plan the shell 5 is of circular cross-section, and when viewed in elevation is of slightly elliptical cross-section. A damping means for damping upward and downward movement of the float in the water comprises a circular annular damping plate 41 which extends laterally from and around the shell 5 at a location corresponding to the location of maximum diameter of the shell 5, which in use, in generally, is below the normal waterline of the float 40.

A pair of keels 42 formed by ribs 43 extend generally downwardly from the shell 5 for minimising pitching and rolling of the float 40. The ribs 43 forming the keels 42 extend between opposite sides of the shell 5 adjacent the damping plate 41, and define respective keel planes which are perpendicular to each other, and extend perpendicularly from a first plane defined by the damping plate 41. The keel planes defined by the respective keels 42 each bisect the float 40.

In this embodiment of the invention only one single coupling plate 44 is provided and extends downwardly from one of the keels 42, and is incorporated in the ribs 43 forming the keel 42. A single bore 45 extends through the coupling plate 44 for securing to a tethering rope, an anchor rope, cable or chain, or for receiving a rope impregnated with muscle spawn which in use would depend downwardly from the float 40.

Strengthening ribs 46 are provided on a top portion of the shell 5 for strengthening the shell 5.

Otherwise, the float 40 is similar to the float 1, and may or may not be pressurised. Where the float 40 is to be pressurised, a suitable pressurising valve (not shown) is provided in the shell 5 similar to that already described with reference to the float 1.

Use of the float 40 is somewhat similar to the float 1, with the exception that in generally, the float 40 will be used in conjunction with ropes, cables or chains depending downwardly therefrom, and may be used for suspending crop ropes impregnated with muscle spawn for growing muscles, or other shellfish, and may also be used as a marker buoy for marking the location of, for example, lobster pots, crab cages on the sea bed, or other such cages and pots on the bed of a lake or river. Alternatively, the float 40 may be used for supporting and marking the location of an anchor rope, cable or chain. The damping plate 41 minimises upward and downward movement of the float 40 in the water, while the keels 42 minimise rolling and pitching of the float 40. Additionally, it has been found that the damping plate 41 also assists in minimising rolling and pitching of the float 40.

Referring now to FIG. 15 there is illustrated a float according to another embodiment of the invention indicated generally by the reference numeral 50. The float 50 is substantially similar to the float 40, and similar components are identified by the same reference numeral. The only difference between the float 50 and the float 40 is in the coupling plate 44, which in this embodiment of the invention is provided with a pair of bores 51 for accommodating a pair of tethering ropes, cables or chains. Use of the float 50 is substantially similar to that described with reference to the float 40 and the float 1.

It is envisaged that the floats described with reference to FIGS. 10 to 15 will be of size in the range of 200 liters to 400 liters, and the damping plate will be of width of the order of 5 cm to 6.5 cm.

Referring now to FIGS. 16 to 21 there is illustrated a floatable structure provided as a navigational buoy also according to the invention and indicated generally by the reference numeral 60. The navigational buoy 60 in this embodiment of the invention is particularly suitable for use as a navigational marker buoy for marking a shipping lane or channel, and is also suitable for carrying a beacon, radar reflector or the like for marking a shipping hazard, and is also suitable for carrying instrumentation, such as for example, weather monitoring instrumentation, such as a device for monitoring wind speed, wind direction, atmospheric air pressure, temperature, humidity or other properties of the environment. In this particular embodiment of the invention the navigational buoy 60 comprises a lower float 61, which is somewhat similar to the float 40, and also comprises a pillar 62 extending upwardly from the lower float 61. The lower float 61 and pillar 62 are of hollow construction, and are integrally formed of plastic material by rotational moulding. The lower float 61 comprises a hollow shell 63, formed by a lower inverted conical shaped portion 64, and an upper portion 65 comprising a cylindrical portion 67 and upwardly tapering portion 68 which extends to a location 69. The pillar 62, which is also of hollow construction extends upwardly from the location 69 and terminates in a receiving means, in this case, a platform 70 for carrying instrumentation, a beacon or a radar reflector or the like as will be described below.

A damping means, in this embodiment of the invention comprises a circular annular damping plate 71 which extends laterally from and around the shell 63 intermediate the lower conical shaped portion 64 and the cylindrical portion 67. The damping plate 71 extends from the shell 63 at a location below the waterline of the floatable structure in normal use. Reinforcing ribs 72 reinforce the damping plate 71 to the cylindrical portion 67 of the shell 63. A single keel 74 extending downwardly from the lower conical portion 64 is formed by a pair of ribs 75 which extend downwardly along and on opposite sides of the lower conical shaped portion 64 from the damping plate 71. In this embodiment of the invention the coupling means is formed by a lower portion of the keel 74 at 76, and a single bore 78 extends through the keel 74 at 76 for accommodating an anchoring rope, cable or chain for locating the navigational buoy 60 at an appropriate location.

In this embodiment of the invention the navigational buoy 60 is illustrated carrying a beacon 80 and a radar reflector 81. The radar reflector 81 is mounted on the platform 70, and the beacon 80 is mounted on the radar reflector 81. The navigational buoy 60 could, as discussed above, be used for carrying any other type of beacon, radar reflector, or instrument.

Use of the navigational buoy 60 is substantially similar to use of the floats 40 and 50 which have already been described. The damping plate 71 damps upward and downward movement of the navigational buoy 60 in the water, and the keel 74 damps rolling movement of the navigational buoy 60. Additionally the damping plate 71 also has an affect on minimising rolling and pitching of the navigational buoy 60.

If desired, the navigational buoy 60 may be provided with ballast for stabilisation of the navigational buoy 60. Where ballast is provided, the ballast will, in general, be located within the hollow interior region of the lower float 61 in the lower portion of the lower inverted conical shaped portion 64. Alternatively, the ballast may be suspended from the lower portion of the keel 46 at 76 which forms the coupling means, or indeed, the ballast may be incorporated in the keel adjacent the portion 76.

It is also envisaged that ballast may be provided in the floats of FIGS. 1 to 15, and in which case, the ballast would typically be located in the hollow interior region of the floats adjacent a lower portion thereof, or may be suspended from the keel.

While the floats and the navigational buoy described with reference to FIGS. 1 to 21 have been described as having a normal waterline defining a third plane which coincides with the first major central plane, it is envisaged in certain cases that the third plane defined by the normal waterline may be spaced apart above or below the second major central plane, although, in general, it is desirable that the third plane defined by the normal waterline should coincide with or be spaced apart above the first major central plane. It will also be appreciated that while the first plane defined by the damping plate has been described as being at a level below the first major central plane, in certain cases, it is envisaged that the first plane defined by the damping plate may coincide with the first major central plane.

While the floats and the navigational buoy have been described as being of a plastics material, it is envisaged that the floats and navigational buoy may be of any other suitable material besides plastics material, and indeed, in many cases may be provided of a metal material, timber, glass, fibreglass or indeed, any other suitable material. It is also envisaged that while the floats and the navigational buoy have been described as being formed by rotational moulding, where the floats and the navigational buoy are provided of a plastic material, they may be formed by any other suitable plastics forming process.

Additionally, while the damping plates have been described as extending completely around the floats and the navigational buoy, while this is desirable, it is not essential. However, it is important that the damping plate should extend from respective opposite sides of the shell of the floats and the navigational buoy. It is envisaged in certain cases, that two or more damping plates spaced apart from each other may be provided at different vertical levels extending from the float or navigational buoy. It will also be appreciated that while the keel of the float of FIGS. 1 to 9 has been described as extending from and between the coupling plates, while this is desirable it is not essential. The keel could be considerably shorter, as could the keels of the floats of FIGS. 10 to 15 and the navigational buoy of FIGS. 16 to 21.

While the floats of FIGS. 1 to 15 have been described as being suitable for use in the growing of mussels, it will be appreciated that the floats of FIGS. 1 to 15 may be used for growing any other marine molluscs. Additionally, it will be appreciated that the floats of FIGS. 1 to 15 may be provided for carrying instrumentation, for example, instrumentation for monitoring weather conditions at sea or the like, such as wind speed and direction, rainfall amounts, temperature, humidity, air pressure and the like. In such cases, the instrumentations may be mounted in or on the shell of the float. When the floats are used for carrying instrumentation, it is envisaged that the floats will be of a larger size than the floats for supporting mussel crop ropes. It is also envisaged that the floats of FIGS. 1 to 15 may be used for marking shipping lanes and areas which are hazardous to shipping, and in which case, the floats may carry lights, which may be battery powered or solar powered.

It is also envisaged that the floatable structure may be a relatively large structure, which could be used as a weather station in the sea, or indeed, a semi-submersible structure which could be of the type which would include accommodation for people living at sea, for example, involved in the recovery of oil from undersea oil wells, or may be provided as a semi-submersible structure of the type used in conjunction with recovering oil and gas from undersea oil wells. In which case, it is envisaged that the floatable structure would be provided with ballast which would be typically located within the hollow interior region of the floatable structure, and the damping means would typically be provided extending on respective opposite sides from the structure relative to the keel of the structure, and preferably, the damping means would extend in a fore and aft direction, and ideally, a keel would be provided extending downwardly from the floatable structure.

While the float and floatable structure have been described as being suitable for carrying beacons, radar reflectors and instrumentation for monitoring weather, it will be readily apparent to those skilled in the art that the float and floatable structures according to the invention may be used for monitoring any other aspect of the environment, for example, pollution and the like. It will also be appreciated that while particular instrumentation which may be carried by the float or floatable structure according to the invention has been described, the float or floatable structure may carry any other suitable or desirable instrumentation. Indeed, it is also envisaged that the float may carry rainfall measuring equipment and instrumentation. It is also envisaged that the float or floatable structure according to the invention may carry communications apparatus, for example, a radio transmitter for transmitting data from the instrumentation. It is also envisaged that the communications apparatus may include a radio receiver for receiving radio signals for activating the radio transmitter for transmitting data collected by the instrumentation. Additionally, it will be appreciated that the float or floatable structure may be adapted for carrying a battery for powering beacons, instrumentation and the like carried by the float or floatable structure, and typically, it is envisaged that the battery would be carried within the hollow interior region thereof. It is also envisaged that the float or floatable structure may carry apparatus for generating electricity, for example, solar panels, apparatus for generating electricity from wind, wave, tide and/or current motion of the water.

While the floats have been described as being of particular sizes and being of sizes within particular size ranges, the floats may be of any other size and size ranges. Further, it will be appreciated that while damping plates of particular widths and width ranges have been described, damping plates of other widths and sizes may be provided. However, in general, the width of the damping plate will be determined by the size of the float, and also by the amount of damping required.

While the floats have been described as comprising reinforcing fillets 25 for reinforcing the joint of the damping plate to the shell of the floats, it is envisaged in certain cases that the fillets may be omitted.

While the floats and navigational buoys according to the invention have been described as being pressurised with compressed air, the floats may be pressurised with any gaseous or liquid medium. It is also envisaged that the floats may be filled with an expanded plastics material, and in general, when filled with an expanded plastics material, the expanded plastics material will be closed cell material.

The invention claimed is:

1. A floatable structure comprising
   a float, the float comprising
   a hollow shell defining an airtight hollow interior region and defining a first major plane coinciding with a horizontal plane, which in use extends through the hollow shell at its maximum horizontal cross-sectional area,
   a damping means extending laterally outwardly from the hollow shell on opposite sides thereof for damping buoyant movement of the hollow shell in water in a generally vertical direction, the damping means defining a first plane extending parallel to the first major plane defined by the hollow shell,
   a pair of coupling means located in the damping means at respective opposite ends of the hollow shell for coupling the float to a mooring rope,
   a keel extending downwardly from the hollow shell for minimising rolling movement of the hollow shell, and extending between the respective coupling means, and the keel defining a corresponding keel plane extending perpendicularly to the first plane defined by the damping means, and
   a pillar extending upwardly from the hollow shell, the pillar being adapted so that the floatable structure is suitable for use as a navigational buoy, and the pillar terminates in a receiving means for receiving any one or more of the following:
   a beacon,
   a radar reflector, and
   instrumentation.

2. A floatable structure as claimed in claim 1 in which ballast is provided in the hollow shell for ballasting the floatable structure.

3. A float comprising:
   a hollow shell defining an airtight hollow interior region and defining a first major plane coinciding with a horizontal plane, which in use extends through the hollow shell at its maximum horizontal cross-sectional area,
   a damping means extending laterally outwardly from the hollow shell on opposite sides thereof for damping buoyant movement of the hollow shell in water in a generally vertical direction, the damping means defining a first plane extending parallel to the first major plane defined by the hollow shell,
   a pair of coupling means located in the damping means at respective opposite ends of the hollow shell for coupling the float to a mooring rope, and
   a keel extending downwardly from the hollow shell for minimising rolling movement of the hollow shell, and extending between the respective coupling means, and the keel defining a corresponding keel plane extending perpendicularly to the first plane defined by the damping means.

4. A float as claimed in claim 3 in which the hollow shell defines a submersible surface, and the damping means extends from the submersible surface.

5. A float as claimed in claim 3 in which the damping means extends completely around the hollow shell.

6. A float as claimed in claim 3 in which the hollow shell is of buoyancy such that a normal water line of the hollow shell defines a third horizontal plane in use, the first plane defined by the damping means extending in use at a level spaced apart from and below the third horizontal plane.

7. A float as claimed in claim 3 in which the hollow shell defines a second major plane coinciding with a vertical plane, which in use extends through the hollow shell at its maximum vertical cross-sectional area, the keel plane defined by the keel coinciding with the second major plane.

8. A float as claimed in claim 3 in which the damping means comprises at least one damping plate.

9. A float as claimed in claim 3 in which a valving means is provided in the hollow shell for facilitating pressurising the hollow interior region with a gaseous medium.

10. A float as claimed in claim 3 in which the hollow shell is of ovoid shape, and the first major plane defined by the hollow shell coincides with a horizontal major plane of the ovoid, and the second major plane defined by the hollow shell coincides with a vertical major plane of the ovoid.

11. A float as claimed in claim 3 in which the hollow shell is adapted for securing to and supporting a tethering rope which is adapted for suspending crop ropes therefrom.

12. A float as claimed in claim 3 in which a pillar extends upwardly from the hollow shell and is adapted for use as a navigational buoy, the pillar terminating in a receiving means for receiving any one or more of a beacon, a radar reflector and instrumentation, the instrumentation being selected from any one or more of the following:
    a temperature sensor,
    a wind speed sensor,
    a wind direction sensor,
    a humidity sensor, and
    an ambient air pressure sensor.

13. A float as claimed in claim 3 in which the float is of plastics material.

14. A float as claimed in claim 3 in which the first plane defined by the damping means extends at a level below the first major plane defined by the hollow shell.

15. A method for damping buoyant movement of a float in water in a generally vertical direction, the float comprising a hollow shell defining an airtight hollow interior region and a first major plane coinciding with a horizontal plane, which in use extends through the hollow shell at its maximum horizontal cross-sectional area, the method comprising:

provuding a damping means extending laterally outwardly from the hollow shell on opposite sides thereof for damping buoyant movement of the hollow shell in water in a generally vertical direction, the damping means defining a first plane extending parallel to the first major plane defined by the hollow shell, providing a pair of coupling means in the damping means at respective opposite ends of the hollow shell for coupling the float to a mooring rope, and providing a keel extending downwardly from the hollow shell for minimising rolling movement of the hollow shell, and extending between the respective coupling means, and the keel defining a corresponding keel plane extending perpendicularly to the first plane defined by the damping means.

16. A method as claimed in claim 15 in which the method further comprises pressurising the hollow interior region thereof with a gaseous medium.

17. A method for growing marine molluscs, the method comprising:

providing a plurality of floats, each float comprising a hollow shell defining an airtight hollow interior region and defining a first major plane coinciding with a horizontal plane, which in use extends through the hollow shell at its maximum horizontal cross-sectional area, providing a damping means extending laterally outwardly from the hollow shell on opposite sides thereof for damping buoyant movement of the hollow shell in water in a generally vertical direction, the damping means defining a first plane extending parallel to the first major plane defined by the hollow shell, providing a keel extending downwardly from the hollow shell for minimising rolling movement of the hollow shell, the keel defining a corresponding keel plane extending perpendicularly to the first plane defined by the damping means, supporting an elongated tethering rope on the plurality of the floats floating on water and spaced apart from each other along the tethering rope, and suspending crop ropes impregnated with a spawn of the marine molluscs from the tethering rope and/or the floats.

18. A float comprising:

a hollow shell defining an airtight hollow interior region and defining a first major plane coinciding with a horizontal plane, which in use extends through the hollow shell at its maximum horizontal cross-sectional area, a damping means extending laterally outwardly from the hollow shell on opposite sides thereof for damping buoyant movement of the hollow shell in water in a generally vertical direction, the damping means defining a first plane extending parallel to the first major plane defined by the hollow shell, a keel extending downwardly from the hollow shell for minimising rolling movement of the hollow shell, the keel defining a corresponding keel plane extending perpendicularly to the first plane defined by the damping means, and a coupling means located in the keel adjacent a lower end thereof in use for coupling the float to a mooring rope.

19. A float comprising:

a hollow shell defining an airtight hollow interior region and defining a first major plane coinciding with a horizontal plane, which in use extends through the hollow shell at its maximum horizontal cross-sectional area, and a second major plane coinciding with a vertical plane, which in use extends through the hollow shell at its maximum vertical cross-sectional area, a damping means extending laterally outwardly from the hollow shell on opposite sides thereof for damping buoyant movement of the hollow shell in water in a generally vertical direction, the damping means defining a first plane extending parallel to the first major plane defined by the hollow shell, and a pair of keels extending downwardly from the hollow shell for minimising rolling movement of the hollow shell, each keel defining a corresponding keel plane, the keel planes of the respective keels extending perpendicularly to each other, and the keel plane of one of the keels coinciding with the second major plane.

* * * * *